(12) United States Patent
Shiraishi et al.

(10) Patent No.: US 6,659,069 B2
(45) Date of Patent: Dec. 9, 2003

(54) METHOD OF STARTING A CYLINDER INJECTION ENGINE

(75) Inventors: Takuya Shiraishi, Hitachinaka (JP);
Toshiharu Nogi, Hitachinaka (JP);
Noboru Tokuyasu, Hitachi (JP); Yoichi Iihoshi, Tsuchiura (JP); Minoru Ohsuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/791,893

(22) Filed: Feb. 26, 2001

(65) Prior Publication Data

US 2001/0025621 A1 Oct. 4, 2001

(30) Foreign Application Priority Data

Mar. 27, 2000 (JP) .......................... 2000-090692

(51) Int. Cl.[7] .................................. F02B 3/04
(52) U.S. Cl. ............... 123/298; 123/491; 123/179.16; 123/305
(58) Field of Search ............... 123/295, 491, 123/305, 179.16, 568.21, 298

(56) References Cited

U.S. PATENT DOCUMENTS

| | | |
|---|---|---|
| 5,881,694 A | 3/1999 | Nakada |
| 5,988,136 A | 11/1999 | Piock et al. |
| 6,029,631 A * | 2/2000 | Jiewertz et al. ............. 123/491 |
| 6,085,718 A * | 7/2000 | Nishimura et al. ......... 123/491 |
| 6,202,624 B1 * | 3/2001 | Stuerz et al. ........... 123/568.21 |
| 6,234,141 B1 * | 5/2001 | Kerns et al. ........... 123/179.16 |
| 6,340,016 B1 * | 1/2002 | Ueda et al. ................ 123/491 |

FOREIGN PATENT DOCUMENTS

| | | |
|---|---|---|
| DE | 199 21 505 | 11/1999 |
| EP | 1 063 427 | 12/2000 |
| GB | 2 329 937 | 4/1999 |
| JP | 9-79066 | 3/1997 |
| JP | 10-176574 | 6/1998 |
| JP | 20000 064874 | 2/2000 |

OTHER PUBLICATIONS

EPO Search Report dated Feb. 12, 2002.

* cited by examiner

Primary Examiner—Erick Solis
(74) Attorney, Agent, or Firm—Crowell & Moring LLP

(57) ABSTRACT

A starting method of an engine wherein a fuel is directly injected into a combustion chamber, the engine having a starter for starting up the engine, the starting method including the steps of actuating the starter and injecting a fuel in a compression stroke when the starter is actuated.

20 Claims, 21 Drawing Sheets

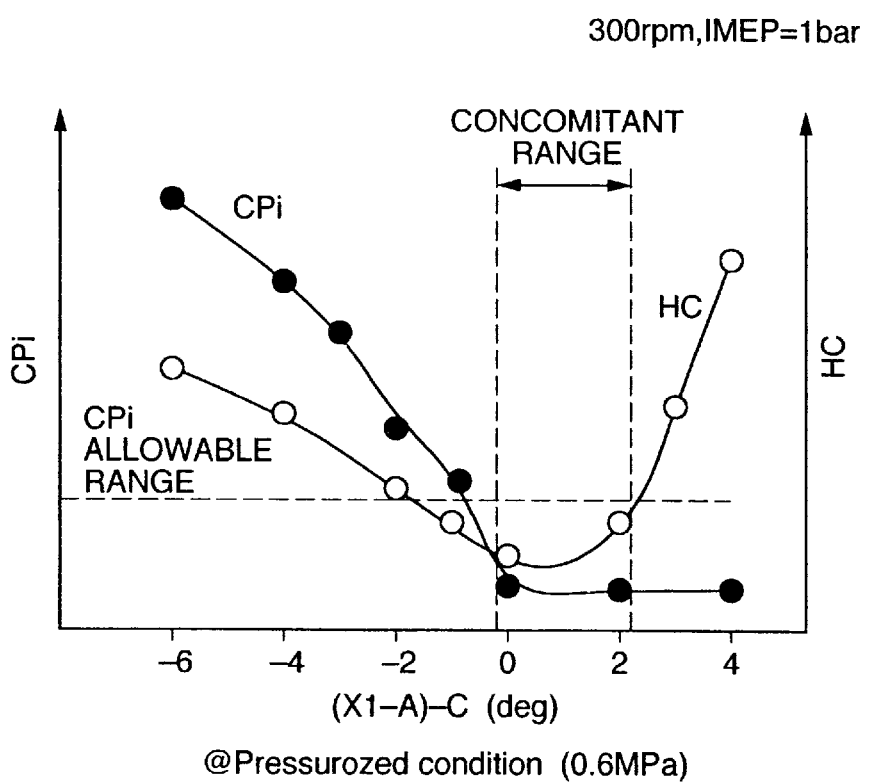

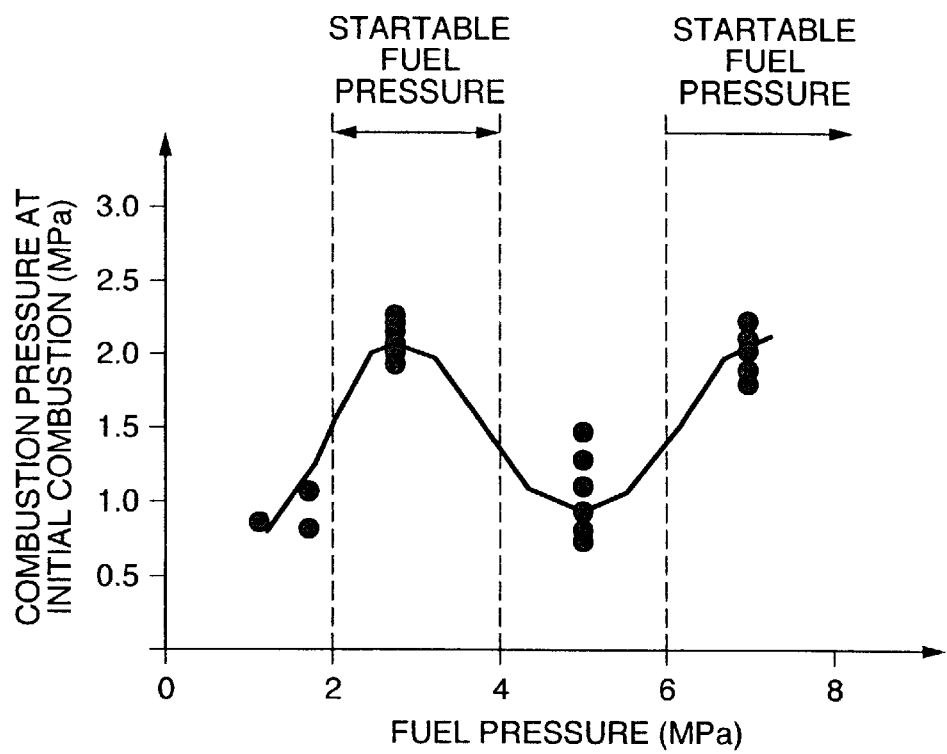

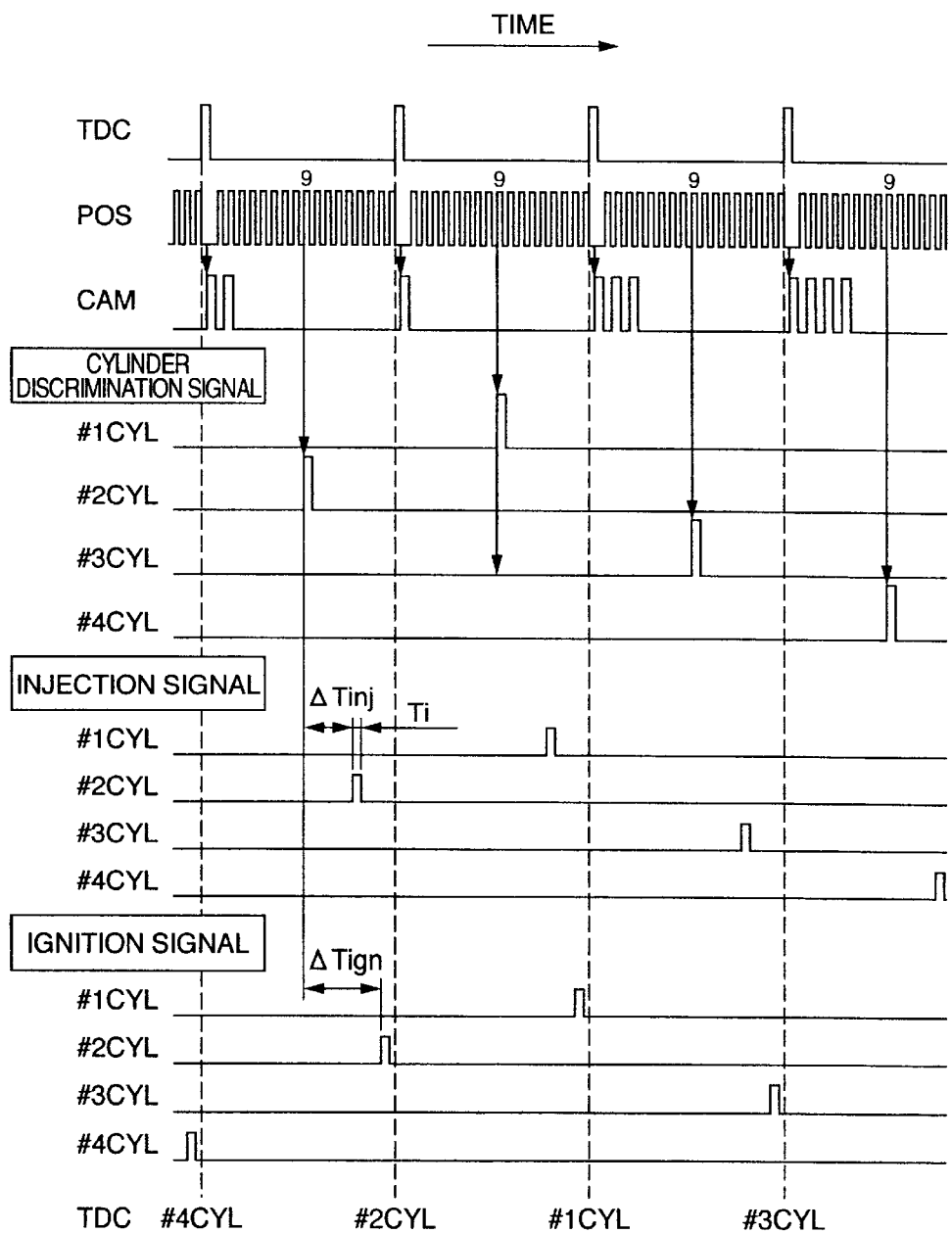

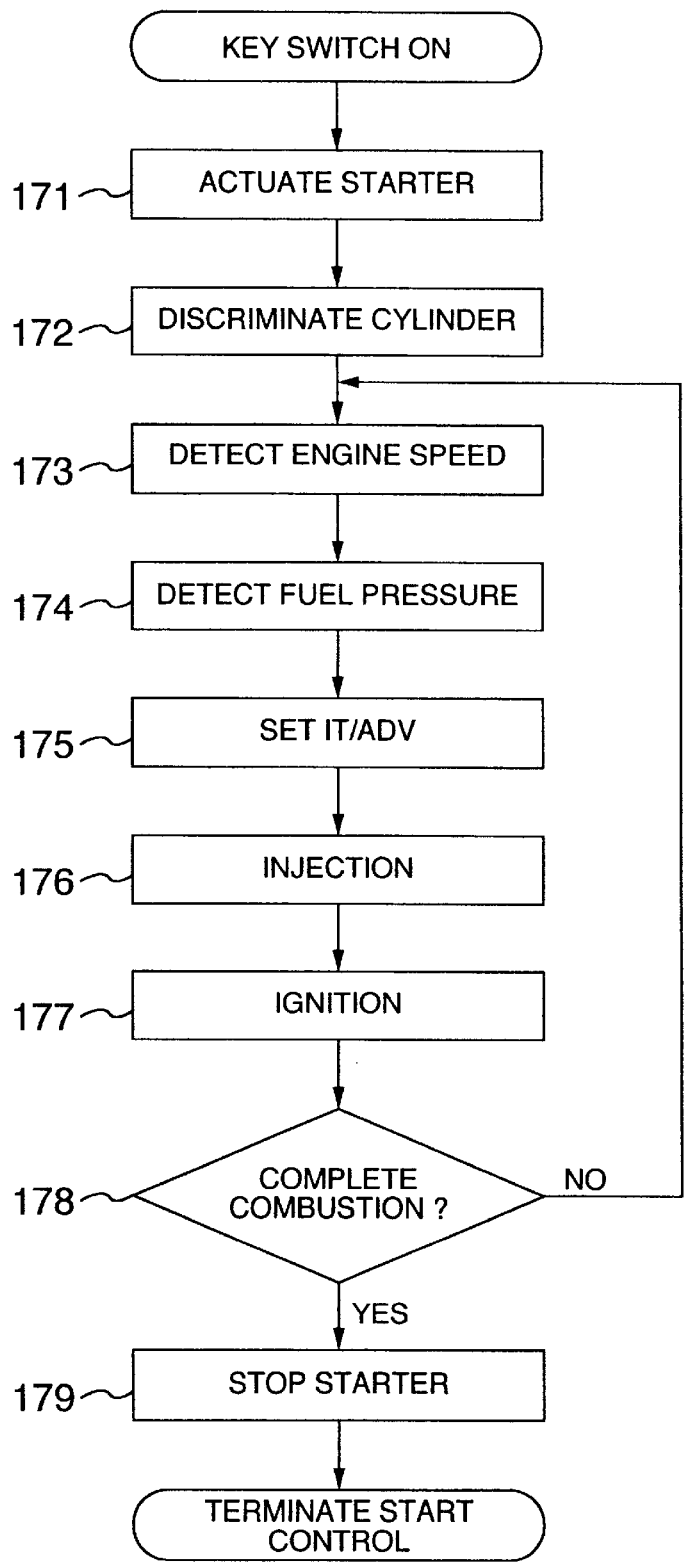

METHOD OF STARTING A CYLINDER INJECTION ENGINE

CROSS-REFERENCE TO RELATED APPLICATIONS

The present application relates to a subject matter described in U.S. Ser. No. 09/793,402, a commonly owned U.S. Patent Application which was filed on Feb. 27, 2001, by Y. Jiboshi, M. Gosuga, T. Nogi, T. Shiraishi and N. Tokuyasu, and entitled "Emission Control Device for Cylinder Fuel Injection Engine". The disclosure of the above-identified commonly owned U.S. Patent Application is herein incorporated by reference.

BACKGROUND OF THE INVENTION

The present invention relates to a cylinder injection engine directly injecting a fuel into a combustion chamber of the engine.

In a cylinder injection engine, it is not possible to inject a fuel while an exhaust value is in open position. Therefore, injection of fuel is performed during an intake stroke and a compression stroke. In an intake stroke injection, fuel is injected while an intake valve is in open position, and fuel is substantially uniformly mixed with air within the cylinder to form a homogenous mixture. In general, effecting spark ignition by an ignition plug for the homogenous mixture for combustion will be referred to as homogenous combustion.

On the other hand, in a certain driving condition of the cylinder injection engine, fuel injection is effective during the compression stroke for forming a stratified charge mixture, in which a rich mixture is formed in the vicinity of the ignition plug for assuming spark ignition performance and a lean mixture is formed around the rich mixture. Such combustion mode will be referred to as stratified charge combustion.

It has been known to drive the engine with switching combustion modes between the homogenous combustion and the stratified charge combustion. One of important factors as switching condition is an engine coolant temperature. When the engine coolant temperature becomes about 80° C., after warming up of the engine, the stratified charge combustion is permitted. Accordingly, under a condition where the engine coolant temperature is low, including starting up of the engine, the homogenous combustion is performed. However, an exhaust gas discharged from the cylinder injection engine is purified by a catalytic converter disposed in an exhaust pipe and then discharged from the exhaust outlet. However, since a temperature of the catalytic converter does not go up to sufficient high temperature for several minutes from starting of the engine, a conversion performance for purifying the exhaust gas is held low. Furthermore, upon starting up of the engine, since a cylinder wall surface or peripheral air temperatures are low, atomization performance of the fuel is low. Therefore, ignitionability is low to degrade combustion condition or even to cause a misfire. In order to attain sufficient ignitionability, fuel in four to five times of necessary amount is injected to increase atomized fuel amount. However, in this method, fuel not contributed for combustion upon starting up of the engine is discharged through an exhaust valve and passes through the low temperature catalytic converter without purification to be discharged to the atmosphere in unpurified form. In the recent years, emission control regulations in Europe and the United States increases strictness. Therefore, it is becoming essential to make the exhaust gas clean even upon starting up of the engine.

As a technology for promoting atomization of fuel, JP-A-9-79066 discloses compensation of a fuel injection timing depending upon the engine coolant temperature and a fuel pressure upon starting up of the engine. According to the disclosed technology, when the engine coolant temperature is low, the fuel injection timing is set at the intake stroke to provide sufficient period for atomization of the fuel. Also, in JP-A-10-176574 discloses injection from a sub-injector installed in an air intake pipe when the engine coolant temperature and the fuel pressure are lower than or equal to predetermined values upon starting up of the engine. In the disclosed technology, by injecting the fuel into the air intake pipe, longer distance to the combustion chamber is provided for providing longer period for atomization of the fuel. In these method, the air/fuel mixture to be formed within the engine cylinder is homogenous mixture and accordingly, combustion mode is homogenous combustion.

SUMMARY OF THE INVENTION

On the other hand, when homogenous combustion is performed in the condition while the engine is not sufficiently warmed, a large amount of unburned fuel component, i.e. HC (hydrocarbon) tends to be discharged. The reason is that non-atomized fuel due to low cylinder wall surface temperature, may deposit on the cylinder wall surface or peripheral surface of the piston.

Therefore, it is an object of the present invention to provide a method of starting a cylinder injection engine which can certainly provide good engine start-up characteristics and can clean an exhaust gas.

According to the first aspect of the present invention, a starting method is provided for a cylinder injection engine which includes a combustion chamber introducing air, a fuel injection valve directly injecting a fuel into the combustion chamber, a piston varying volume of the combustion chamber, and a starter for starting up the engine. The method comprises the steps of:

starting the engine; and injecting a fuel in a compression stroke when the starter is actuated for starting up the engine.

According to the second aspect of the present invention, a fuel pressure is set within a range of 2 to 4 MPa, or greater than or equal to 6 MPa.

According to the third aspect of the invention, a fuel is injected during a compression stroke of the cylinder after actuating the starter is actuated for starting up the engine, and making judgment that the cylinder is in compression stroke.

According to the fourth aspect of the present invention, the engine has an EGR piping connecting an exhaust pipe to an air intake pipe and an EGR valve, the EGR valve is opened while the starter is actuated for starting up the engine, and a fuel is injected during a compression stroke.

According to the fifth aspect of the invention, the engine has a variable valve mechanism for controlling opening and closing timing of an intake valve, a valve closing timing of the intake valve is controlled at the maximum retard position while the starter is actuated for starting up the engine and a fuel is injected during a compression stroke.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 8 is a chart showing a result of experiments showing a relationship between spray upper end angle and an engine performance upon starting up of engine in stratified charge combustion mode;

FIG. 9 is a chart showing a relationship between a fuel pressure and starting ability upon starting up of the engine;

FIG. 16 is a signal timing chart in stratified charge mixture starting up;

FIG. 17 is a flowchart of stratified charge mixture start-up control;

DESCRIPTION OF THE EMBODIMENTS

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
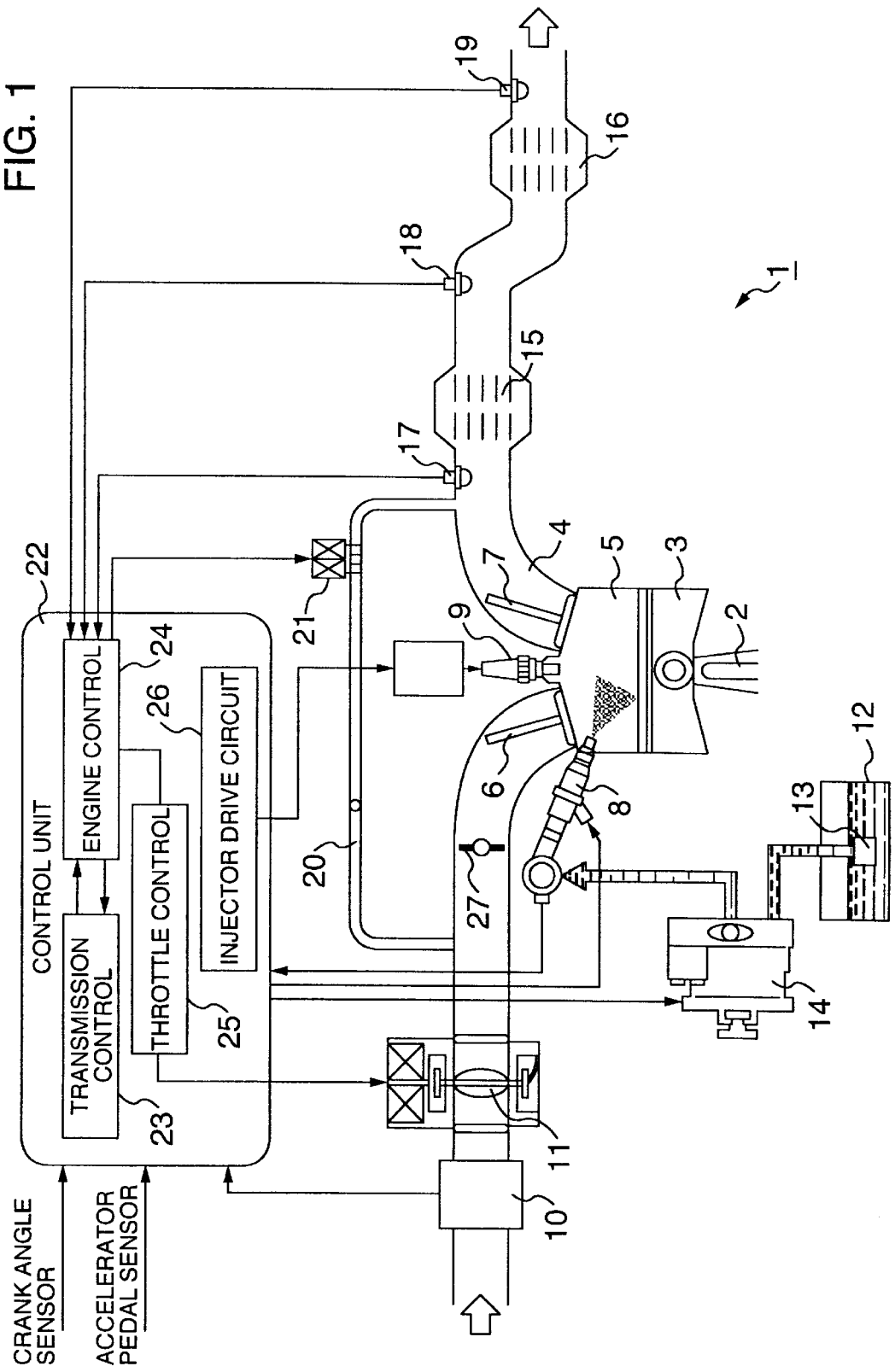
FIG. 1 is a diagrammatic illustration of an engine for implementing a starting method according to the present invention.

FIG. 1 is an illustration showing a construction of a cylinder injection engine for implementing the present invention. An engine 1 shown in FIG. 1 has a not shown crank mechanism. A connecting rod 2 connected to the crank mechanism serves for converting a reciprocal motion of a piston 3 into rotating motion. By an engine head 4, combustion chamber 5 is defined. The combustion chamber 5 is enclosed by intake valves 6, exhaust valves 7, fuel injection valves 8 and ignition plug 9. By reciprocal motion of the piston 3, the engine 1 sucks the air necessary for combustion into the combustion chamber 5. Air to be introduced into the engine 1 is removed dust and dirt contained in the atmospheric air by a not shown air cleaner and then metered an intake air flow rate by an air flow sensor 10. The intake air flow rate is controlled by a throttle valve 11. In the shown embodiment, the throttle valve 11 is an electronically controlled throttle valve which is operated electronically on the basis of an operation magnitude of an accelerator pedal. However, the throttle valve may be a mechanical type throttle valve which is mechanically operated through a linkage wire. A fuel to be supplied to the engine is pressurized by a feed pump 13 or a fuel pump 14 installed within a fuel tank 12, and is directly injected into the combustion chamber 5 by a fuel injection valve 8. In the combustion chamber 5, fuel and air are mixed to form a mixture for combustion by the ignition plug 9. Exhaust gas is discharged through the exhaust valve 7 and then discharged through a three-way catalytic converter 15 and NOx catalytic converter 16 installed in an exhaust pipe. A control unit 22 controlling the engine 1 detects driving condition of the engine on the basis of signals of various sensors and controls an electronically controlled throttle valve 11, a fuel pump 14, a fuel injection valve 8, an ignition plug 9 and an EGR valve 20 on the basis of result of detection. The control unit 22 may be realized by a computer including CPU operated according to programs, memory storing control programs and data, input/output control unit and buses mutually connecting these components.

An operation magnitude (depress stroke) of the accelerator pedal operated by the driver of the vehicle mounting the engine 1 is detected by a not shown accelerator sensor and is input to the control unit 22. To the control unit 22, signals from various sensors (for example, the engine revolution speed, an intake manifold pressure, an intake air temperature, the engine coolant temperature, an accelerator operation magnitude, the air flow rate and so forth) are input. Other input signals may be signals from the crank angle sensor mounted on the crankshaft, signal from an air/fuel ratio sensor 17 mounted within the exhaust pipe, signal from a temperature sensor 18 detecting a temperature of the exhaust gas and so forth. The control unit 22 is constructed with a transmission control portion 23, an engine control portion 24, a throttle control portion 25, an injector drive circuit 26 and so forth. The EGR valve 21 recirculates the exhaust gas from the exhaust pipe to the air intake pipe and is installed within an EGR piping 20.

Figure 2:
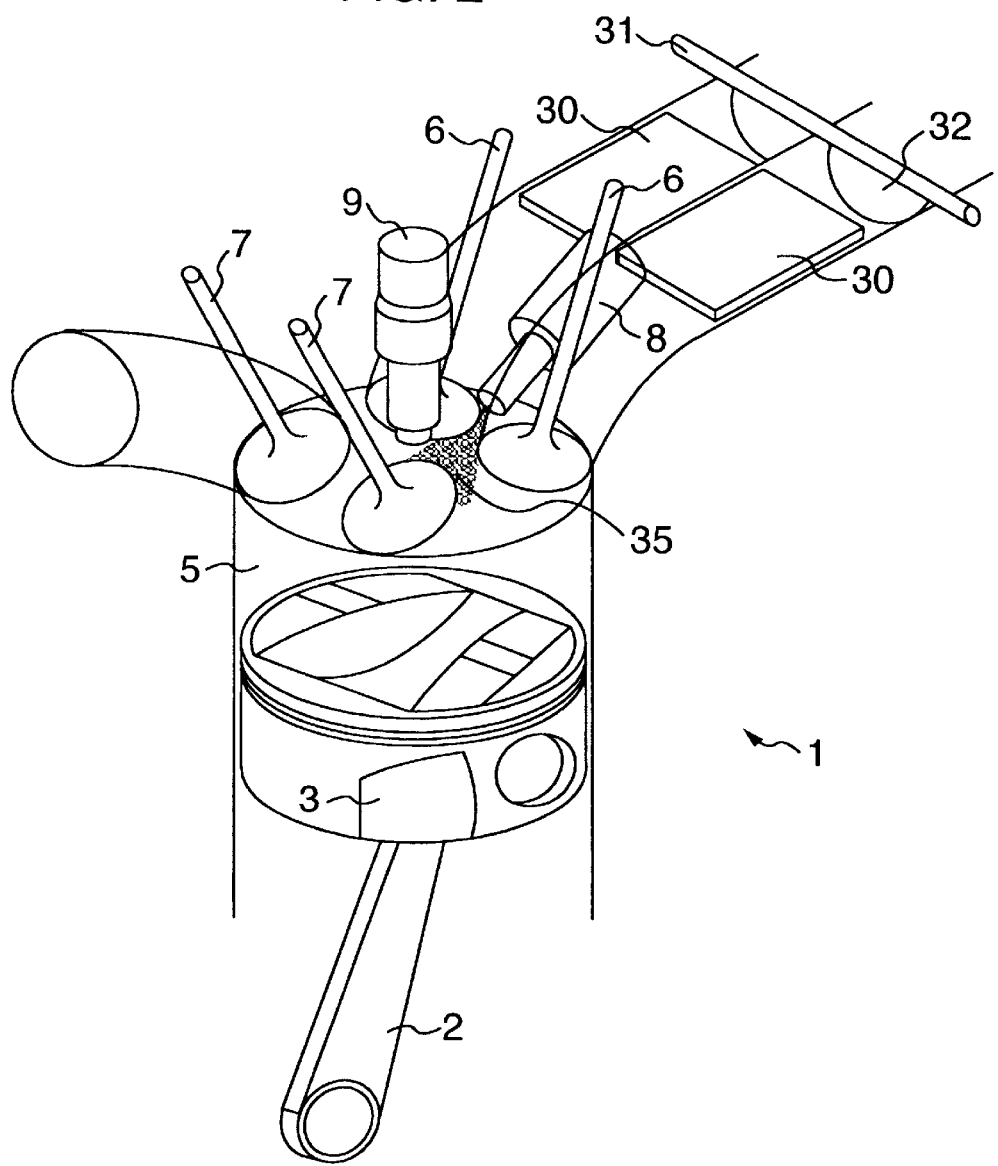
FIG. 2 is a perspective view showing a construction of the first embodiment of the engine according to the present invention.

FIG. 2 shows a construction of the engine according to the present invention, and is a perspective view of the major part of the shown embodiment of the cylinder injection engine. Major components are cut-out valves 32, a shaft 31 and partitioning plates 30 serving as an air current generating device generating an air current within the combustion chamber, the fuel injection valve 8 for injecting the fuel into the combustion chamber 5, and the piston 3 having a top surface configured for obtaining sufficient tumble flow. In the upper portion of the combustion chamber 5, namely on the side opposing to the piston 3, two intake valves 6, two exhaust valves 7, the ignition plug 9 and the fuel injection valve 8 are mounted. The combustion chamber 5 formed with these components varies a volume thereof according to reciprocal motion of the piston 3. When the piston 3 moves downwardly in the condition where the intake valves 6 are opened, air is introduced through intake ports. An air amount to be sucked into the combustion chamber 5 is measured by an air flow rate sensor. On the basis of the value of the air amount, a fuel amount to be injected from the fuel injection valve 8 is determined. Two intake valves 6 are provided each cylinder for sucking the air in order to introduce more amount of intake air flow. The intake ports form the air passages connected to the intake values 6. The fuel injection valve 8 is provided between these passages, namely between two intake valves 6. The fuel injection valve 8 is provided with placing the center axis thereof perpendicular to a piston pin or the crankshaft. The center axis of the fuel injection valve 8 is inclined toward the portion below the ignition plug 9 so that fuel 35 may concentrated in a portion around the ignition plug 9 mounted at the upper portion of the combustion chamber 5. By mounting the fuel injection valve 8 in a manner set forth above, the fuel 35 may be widely distributed within the combustion chamber 5 in the intake stroke injection and may be concentrated the sprayed fuel around the ignition plug 9 in the compression stroke injection. A tumble flow generated within the combustion chamber 5 becomes a layer of the air current to form a wall of the air flow. By such air current, the fuel spray 35 is transported toward the ignition plug 9. Also, since the wall of the air flow guides the fuel, deposition of the piston on the top surface of the piston can be prevented. This system is referred to as tumble guide system. The fuel spray 35 is set spray shape and injecting direction to easily reach around a plug gap of the ignition plug 9.

Figure 3:
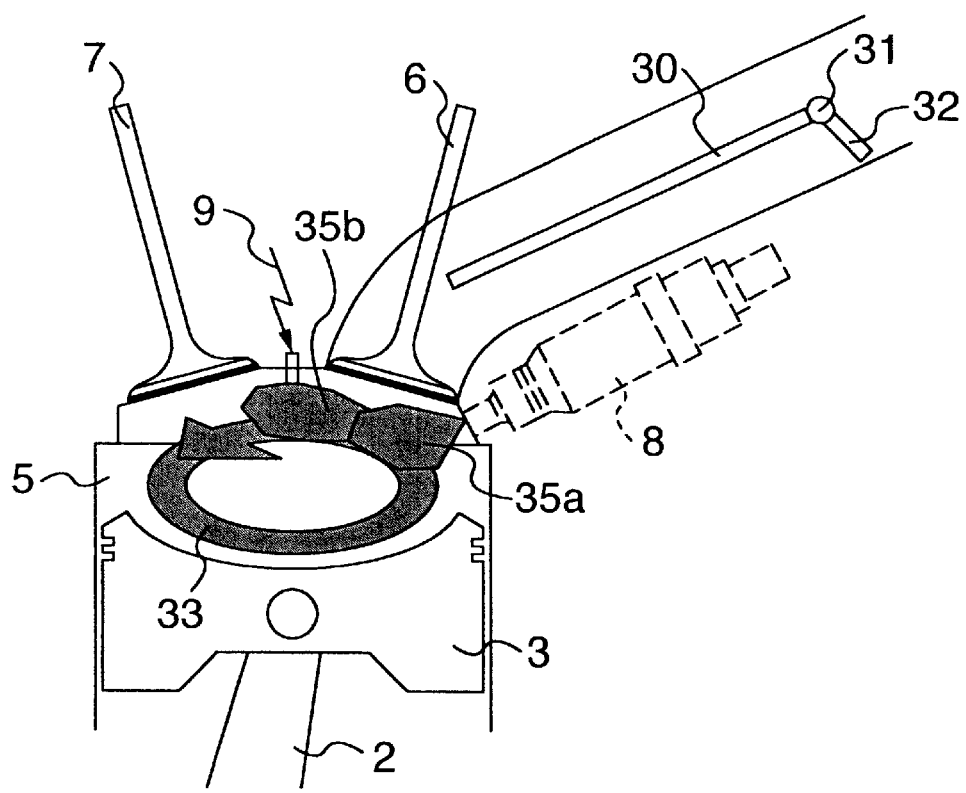
FIG. 3 is a side elevation of a portion of the engine diagrammatically showing a mixture distribution in a combustion engine in stratified charge operation mode.

FIG. 3 is a diagrammatic illustration showing a mixture distribution in the combustion chamber during stratified charge operation of the cylinder injection engine shown in FIG. 1. Here, it is assumed that a vehicle travels at a constant speed 60 km/h (engine revolution speed is about 2000 r.p.m.). The tumble generating device installed within the intake port is constructed with the cut-out valves 32, the shaft 31 and the partitioning plates 30. When the cut-out valve 32 is closed, most of the intake air during intake stroke flows into the combustion chamber through upper side of the partitioning plates 30. As a result, tumble air current in the combustion chamber 5 is formed. The air introduced during the intake stroke where the intake valve is opened, flows along the peripheral wall of the combustion chamber on the side remote from the fuel injection valve 8, namely on the side of the exhaust valve. The top surface of the piston 3 is formed in arc shaped configuration for making air current 33 smooth, and grooves are provided for preventing diffusion. With taking such construction, air layer is formed on the top surface of the piston to prevent adhesion of fuel. Furthermore, air current 33 is blown up toward the fuel injection valve 8 and flows along the peripheral wall of the combustion chamber on the side where the fuel injection valve 8 is mounted, upper wall, namely ceiling of the combustion chamber 5 to form a swirl current. Fuel; spray 35a is then transferred toward the ignition plug by the swirl flow 33. As a result, fuel spray 35b may reach the plug gap of the ignition plug 9 irrespective of the position of the piston and irrespective of the engine revolution speed. Since the relationship is determined depending upon only distance from the fuel injection position to the plug gap and spray speed. Therefore, stratified charge operation becomes possible up to high engine revolution speed range (e.g. 3200 r.p.m.) The tumble air flow 33 used in the shown embodiment is introduced through the intake valve 6, then reaches toward the peripheral wall surface of the combustion chamber on the side of the exhaust valve 7 and then return toward the intake valve side along the top surface shape of the piston. The fuel spray 35a injected from the fuel injection valve 8 mounted between the intake valves 6 rides on the air flow to reach the ignition plug 9 through a minimum distance. If the fuel injection valve 8 is located on the side of the exhaust valves 7, the fuel spray 35a flows to the intake valve 6 side along the top surface of the piston and then reaches the ignition plug 9 to take a long period from injection to reach the ignition plug 9. Furthermore, locating the fuel injection valve 8 on the side of the exhaust valves 7 is not preferred for because of possibility of fuel adhesion on the top surface of the piston.

In the experiments employing the shown embodiment of tumble guide type cylinder injection engine, an injection timing and ignition timing for stable operation at 1400 r.p.m. of the engine revolution speed and 320 kPa of shown mean effective pressure Pi, were respectively 70° BTDC and 35° BTDC. At this time, a period from injection to the ignition was about 3 msec. an injection timing and ignition timing for stable operation at 3200 r.p.m. of the engine revolution speed and 350 kPa of shown mean effective pressure Pi, were respectively 90° BTDC and 30° BTDC. At this time, a period from injection to the ignition was about 3.12 msec. Accordingly, in the shown embodiment of the tumble guide cylinder injection engine, a period from injection to ignition is about 3 msec. irrespective of the engine revolution speed.

Figure 4:
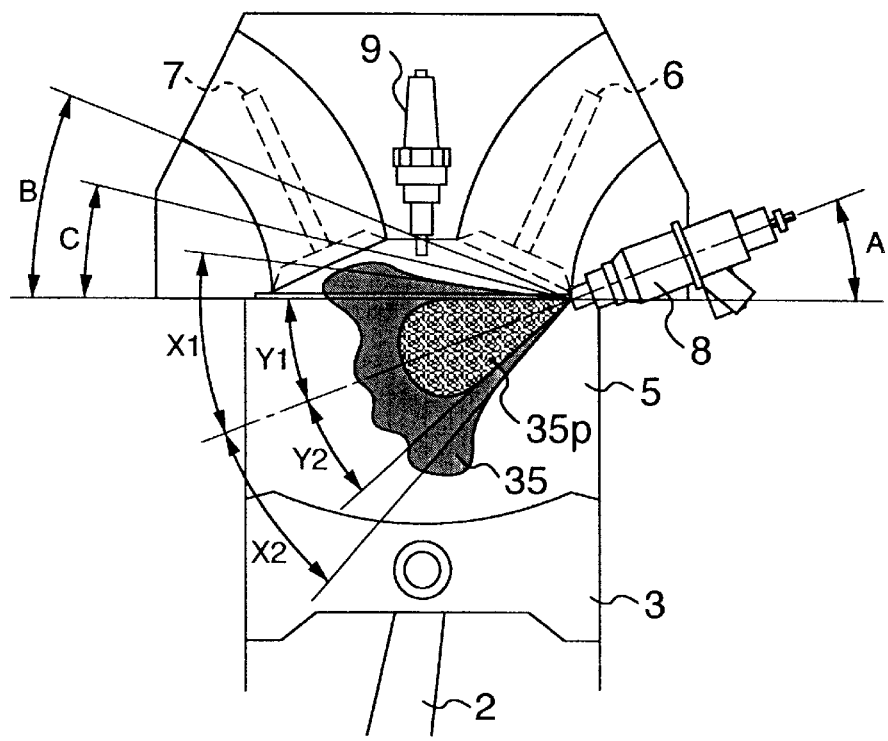
FIG. 4 is a side elevation showing a positional relationship between an ignition plug in the combustion chamber and atomized fuel injected from a fuel injection valve.
Figure 5:
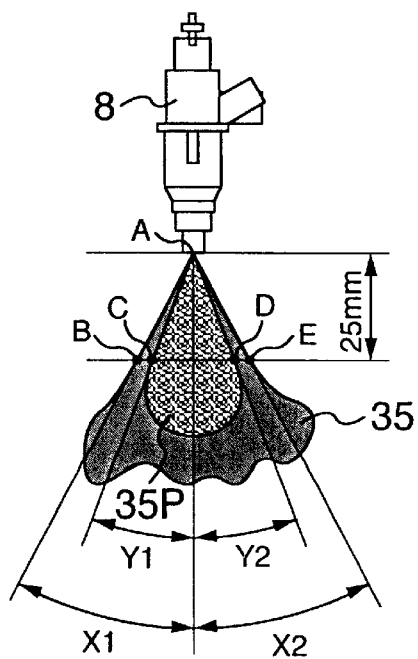
FIG. 5 is an explanatory illustration of a spray angle measuring method of a fuel spray to be employed in the embodiment of the present invention.

FIG. 4 shows a manner of experimentarily considering a condition for establishing stratified charge combustion of FIG. 3, namely arrangement of the fuel injection valve, position of the ignition plug and shape of spray, made by the invention, and shows a diagrammatical illustration of a positional relationship between the ignition plug 9 within the combustion chamber 5 and fuel spray 35 injected from the fuel injection valve 8. The shape of the fuel spray 35 illustrated in FIG. 4 is that formed when the ambient atmosphere is in atmospheric pressure, and the shape of the fuel spray 35P is that formed under 0.6 Mpa. In the intake stroke and former half of the compression stroke, the pressure within the combustion chamber 5 is maintained substantially at the atmospheric pressure, the shape of the fuel spray is as illustrated by 35. In the latter half of the compression stroke, the volume of the combustion chamber is reduced due to upward stroke of the piston 3 to elevate the pressure. The ambient pressure at the injection timing is variable in a range from about 0.1 to about 1.0 MPa. Such variable shape of the spray shape is represented by that at 0.6 MPa for specifying the shape. A spray angle of the fuel spray 35 under atmospheric pressure is expressed by X1+X2, and a spray angle of the fuel spray 35P under pressurized condition is expressed by Y1+Y2. A measurement method of the spray angle is shown in FIG. 5. A triangle is formed by a nozzle tip end A of the fuel injection valve 8 and points on outer extreme of the fuel spray at a position 25 mm below the nozzle tip end to take a top angle thereof as the spray angle. Namely, in case of the fuel spray 35, the top angle of the triangle B-A-E is taken as the spray angle, and in case of the fuel spray 35P, the top angle of the triangle C-A-D is taken as the spray angle.

In FIG. 4, the fuel injection valve is mounted on the engine at an angle A with respect to a horizontal plane. The angle A is referred to as a mounting angle. The upper wall of the combustion chamber including the intake valves 6 is inclined at an angle B relative to the horizontal plane. On the other hand, the plug gap of the ignition plug 9 is inclined at an angle C relative to the horizontal plane. For stratified charge operation in the tumble guide type cylinder injection engine according to the invention, it is important that the fuel spray reaches around the plug gap of the ignition plug 9. On the other hand, it is also important to prevent the fuel from adhesion on the upper wall of the combustion chamber in order to reduce HC. Accordingly, it would facilitate to understand by expressing the position of the outer extreme of the fuel spray on the side of the ignition plug 9 with an angle relative to the plug gap. An angle defined by the following equation using the angle C expressing the plug gap position and the angle (X1-A) expressing the position on the outer extreme will be referred to as an upper end angle J.

$$\text{Upper Angle } J = (X1-A)-C \tag{1}$$

The equation (1) expresses the upper end angle under the atmospheric pressure. The upper end angle J' under pressurized condition is expressed by the following equation (2).

$$\text{Upper Angle } J' = (Y1-A)-C \tag{2}$$

Since the upper end angle is expressed by the spray angle, the mounting angle of the fuel injection valve and the plug gap position, it is applicable not only for particular engine but also for various engine.

Figure 6:
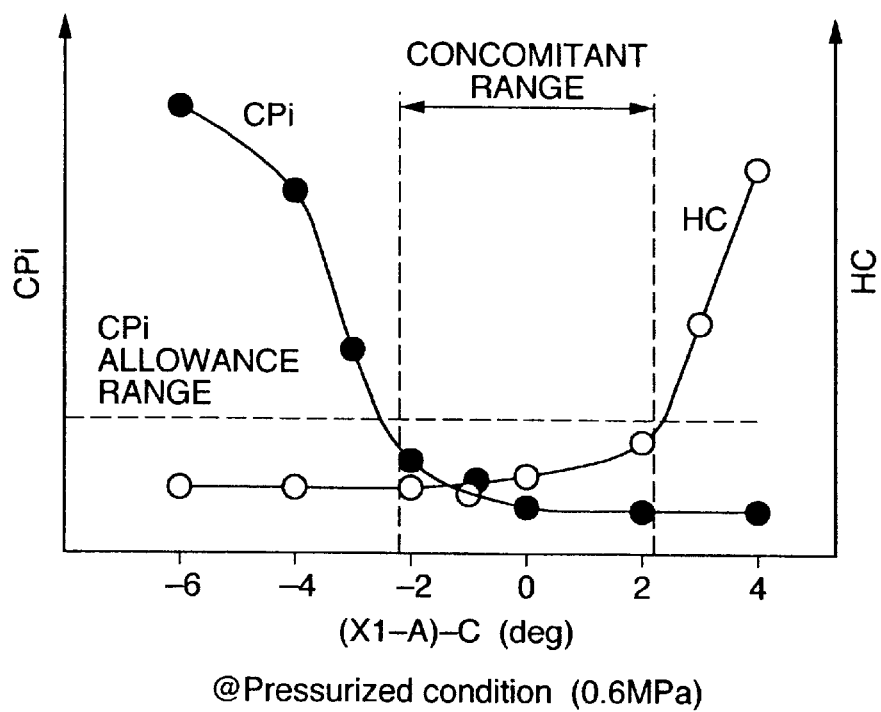
FIG. 6 is a chart showing a result of experiments showing a relationship between spray upper end angle and an engine performance.

FIG. 6 shows a result of experimentarily derived relationship between the upper end angle and the engine performance. In FIG. 6, a horizontal axis represents the upper end angle J' under pressurized condition, the left vertical axis represents a combustion fluctuation rate Cpi and the right vertical axis represents emission concentration of HC (hydrocarbon). Cpi represents a fluctuation from a mean combustion pressure in about 100 to 1000 cycles, in which smaller value represent higher combustion stability. The upper end angle 0° represents that the outer extreme position of the fuel spray is the same as the plug gap position of the ignition plug. When the upper end angle is smaller than 0°, the outer extreme position of the fuel spray does not reach the plug gap. In such case, the combustion fluctuation rate Cpi is large. When the upper end angle is greater than or equal to -2°, Cpi becomes smaller than or equal to an allowable combustion fluctuation criterion and thus falls within the allowable range. When the upper end angle -2°, the fuel spray does not each the plug gap. However, since the fuel spray is blown up toward the plug gap by the tumble air current, the fuel spray actually reaches the plug gap. On the other hand, HC emission concentration has to be as small as possible. When the upper end angle is large, the outer extreme position of the fuel spray should reach the upper wall of the combustion chamber to deposit thereon to increase HC emission concentration. In the example of FIG. 6, HC concentration increases at the upper end angle greater than or equal to 2°. From this, it can be appreciated that when the upper end angle is greater than or equal to 2°, fuel may deposit on the upper wall of the combustion chamber. While the foregoing definition does not include the angle B representative of the upper wall position of the combustion chamber. However, the upper wall position of the combustion chamber may be predicted from emission of HC. Accordingly, when the upper end angle is in a range of -2° to 2°, both of the combustion fluctuation ratio Cpi and HC emission concentration can be maintained within the allowable range.

Figure 7A:
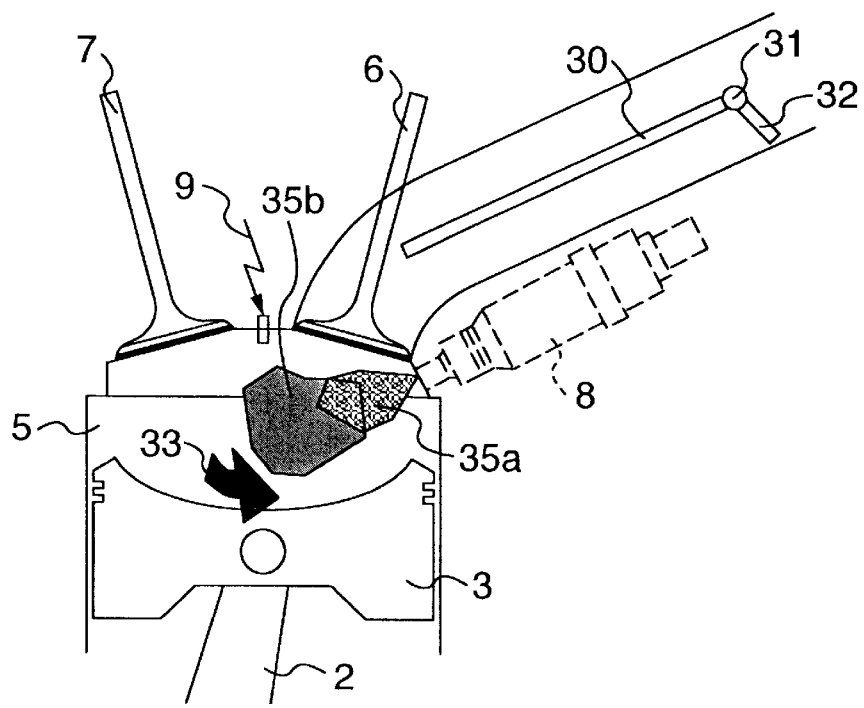
FIGS. 7A and 7B are side elevations diagrammatically showing conditions of the mixture in a combustion chamber upon starting up of the engine.
Figure 7B:
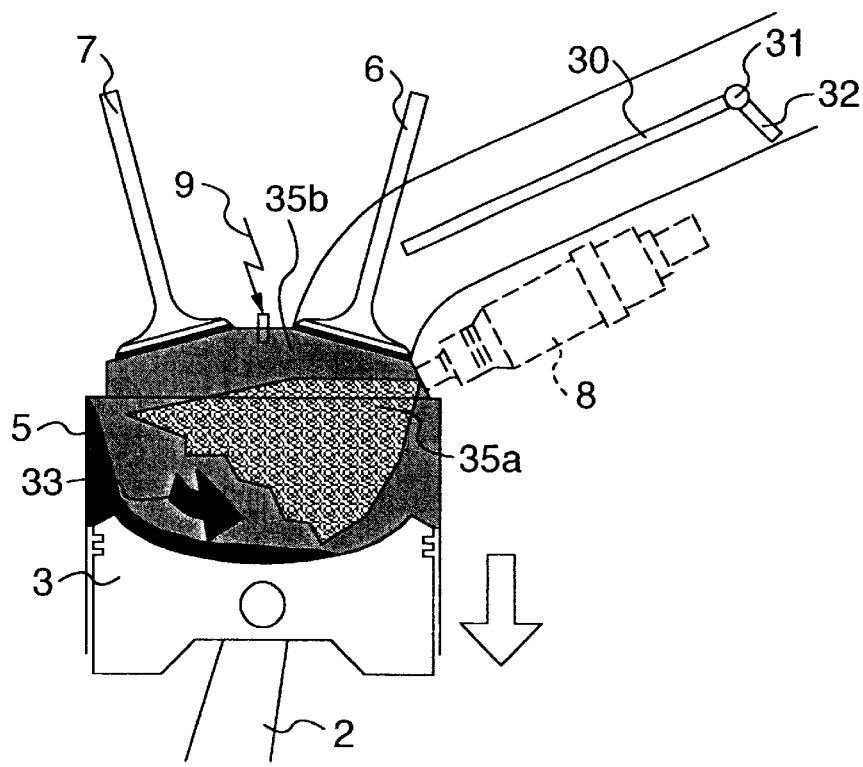

FIG. 7A diagrammatically shows a mixture condition within the combustion chamber upon starting of the cylinder injection engine as shown in FIG. 1. The engine revolution speed at starting is about 200 r.p.m. When the engine is started with the homogenous combustion method as disclosed, a part of the injected fuel forms the homogeneous mixture 36 and the other part is maintained in liquid state to deposit on the cylinder wall surface or piston wall surface. The fuel adhering on the wall surface is the cause of discharge of unburned HC. One of the important feature of the present invention is prevention the fuel from depositing on the wall surface and stratified charge combustion is performed. Since the engine revolution speed upon starting up of the engine is low at about 200 r.p.m., air current 33 generated in the combustion chamber 5 is weak to satisfactorily transfer the fuel spray 35 toward the ignition plug 9. Therefore, when the upper end angle of the fuel spray under pressurized state is 0 to -2°, the fuel spray 35 may not reach the plug gap of the ignition plug 9 to cause difficulty of ignition to possibly cause a misfire. Accordingly, for effecting stratified charge combustion upon starting up of the engine, the spray has to be selected to have the upper end angle under pressure to within as range of 0° to +2°.

FIG. 8 shows a condition necessary satisfying a stratified charge combustion condition upon starting of the engine. Upon starting of the engine, the engine revolution speed is low to hardly cause air current necessary for tumble guide combustion. Namely, action to blow up the fuel spray toward the ignition plug by the air current is weak. Therefore, when the upper end angle of the fuel spray is not more than 0°, the fuel spray may not reach the plug gap to degrade combustion fluctuation rate. Also, at the same time, HC is increased due to the misfire. Accordingly, even in the injection timing even at the latter half of the compression stroke, the upper end angle of the fuel spray under pressurized condition is desirably set at 0 to +2° to easily reach to the plug gap of the ignition plug.

FIG. 9 shows a relationship between the fuel pressure and startability of the engine upon starting up, which shows a result of measurement of the maximum fuel pressure at the initial combustion with varying the fuel pressure within a range of 1 to 7 MPa upon starting up of the engine. It has been found that when the maximum pressure at the initial combustion is in excess of 1.5 MPa, combustion can be caused continuously. This is because sufficient combustion is caused in the combustion chamber and converted into an engine torque sufficient for compressing the next cylinder. Accordingly, with taking the maximum pressure at 1.5 MPa as a reference for detection of the initial combustion, when the fuel pressure is lower than or equal to 2 MPa, combustion pressure is about 1.0 MPa to be judged that sufficient combustion is not caused. At fuel pressure at 3 MPa, the combustion pressure higher than or equal to 2 MPa is stably developed to result in success of starting up of the engine. When the fuel pressure is 5 MPa, the combustion pressure again becomes lower than 1.5 MPa, and furthermore, fluctuation is caused in the maximum pressure value. This represent the condition where combustion is successful in certain timing and combustion is failed in another certain timing to make engine operation unstable. When the fuel pressure is 7 MPa, combustion pressure becomes higher than or equal to 2.0 MPa to succeed starting up of the engine. At this time, the fuel injection time was maintained constant at 40° BTDC.

Figure 10:
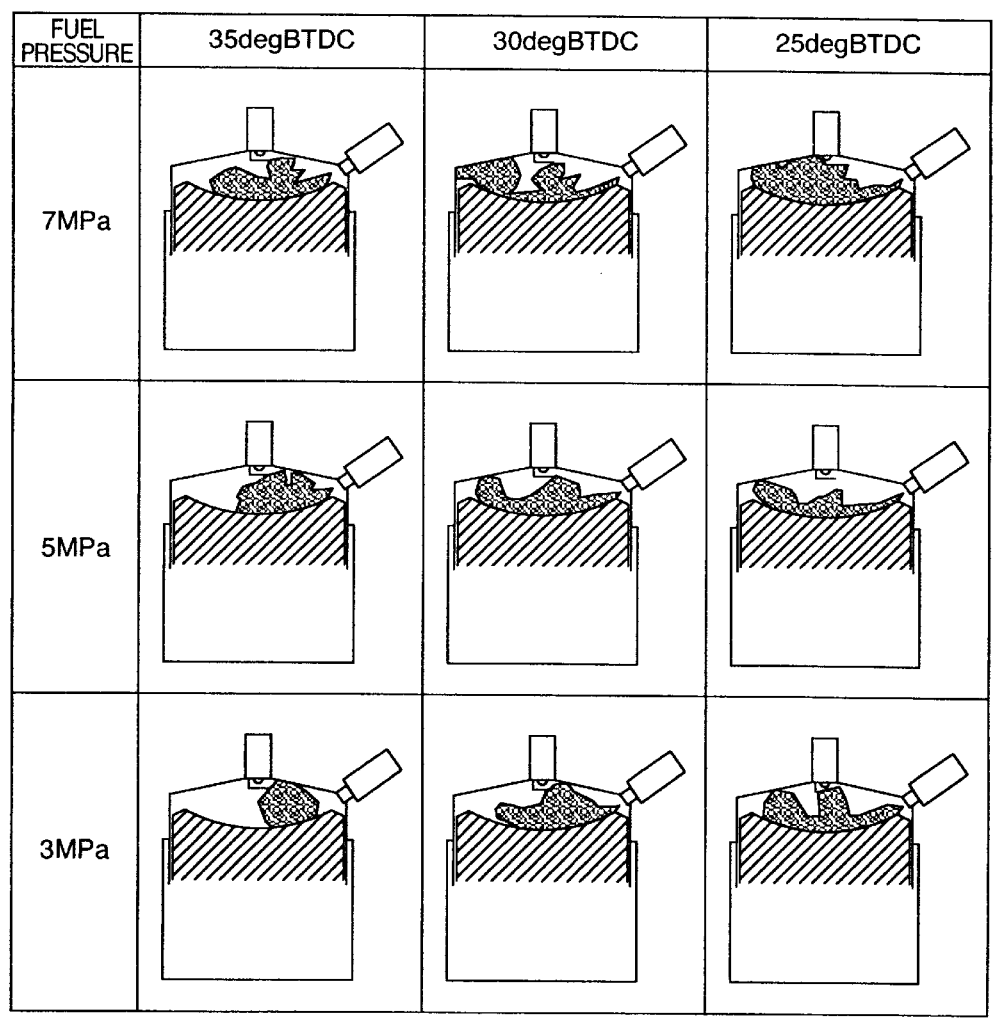
FIG. 10 shows a result of simulation analysis of behavior of mixture in the combustion chamber upon starting up of the engine.

FIG. 10 shows a result of simulation analysis of behavior of mixture in the combustion chamber upon starting up of the engine. As condition for calculation, the engine revolution speed is set at 300 r.p.m. and fuel injection timing is set at 40° BTDC adapting to the experiment shown in FIG. 9. When the fuel pressure is 3 MPa, fuel spray has low spray penetration at 35° BTDC immediately after injection and the pressure in the combustion chamber is elevated to about 1.0 MPa. Therefore, the fuel spray compact shape. At a range of 30° BTDC to 25° BTDC, the spray near the surface of the piston flows as sliding on the piston. However, the spray around the ignition plug is held stagnant for absence of air current. Ignition is effected for such stagnant fuel spray. When the fuel pressure is 5 MPa, since the spray penetration of the fuel spray becomes large to increase component sliding on the surface of the piston. Since the stagnant fuel spray around the ignition plug is drawn to this flow to make the mixture around the ignition plug lean to make ignition impossible. When the fuel pressure is 7 MPa, since the spray penetration of the fuel spray becomes further greater to collide the fuel spray sliding on the surface of the piston onto the cylinder wall surface on the side of the exhaust valve to reflected therefrom. Around 25° BTDC, the fuel spray reaches the ignition plug to enable ignition.

Figure 11:
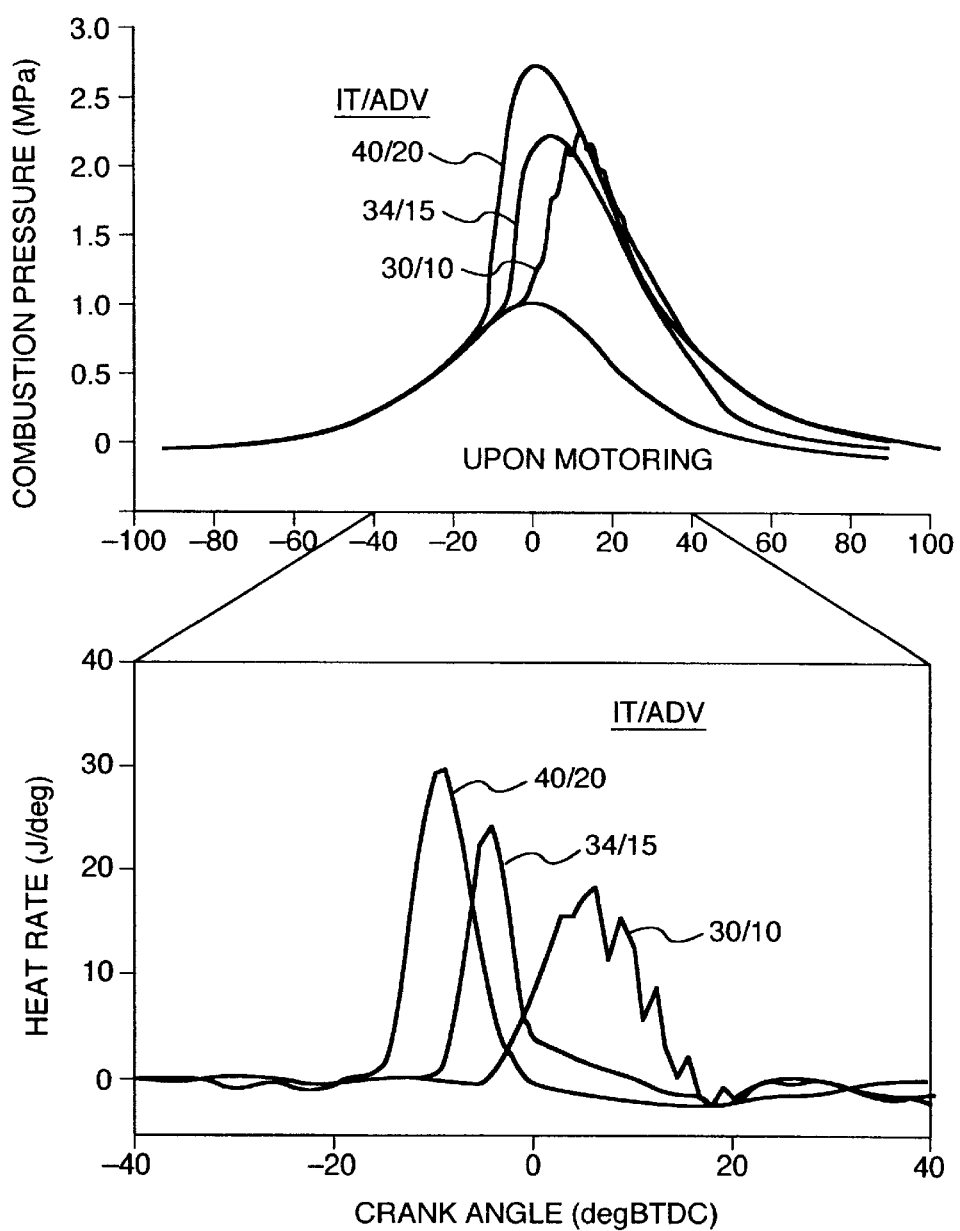
FIG. 11 is a chart showing a in-cylinder pressure and heat generation rate upon starting up of the engine.

FIG. 11 shows a cylinder pressure and heat rate upon starting up of the engine. With setting the engine revolution speed at 300 r.p.m., fuel injection timing and the ignition timing are varied. A period from injection to ignition is determined depending upon the positions of the fuel injection valve and the ignition plug, the ignition timing is varied associating with variation of the injection timing. In the shown case, an interval between injection to ignition is 20° as converted into the crank angle. When injection timing/ignition timing is 40/20° BTDC, the maximum combustion pressure in the combustion chamber becomes largest. When injection timing/ignition timing is 34/15° BTDC, the combustion pressure rising position is delayed and the maximum pressure is lowered. When injection timing/ignition timing is 30/10° BTDC, the combustion pressure rising position is further delayed but the maximum pressure is held substantially unchanged for the case where injection timing/ignition timing is 34/15° BTDC. Concerning the heat rate, when the injection timing/ignition timing is 40/20 and 34/15, the peak positions are located before top-dead center (0° in FIG. 11). This means that combustion is cased before top dead center to interfere upward stroke of the piston. Accordingly, in order to effectively convert the pressure energy generated by combustion into torque, it becomes necessary to set the injection timing/ignition timing at 30/10° BTDC to have the peak of the heat rate after top-dead-center.

Figure 12A:
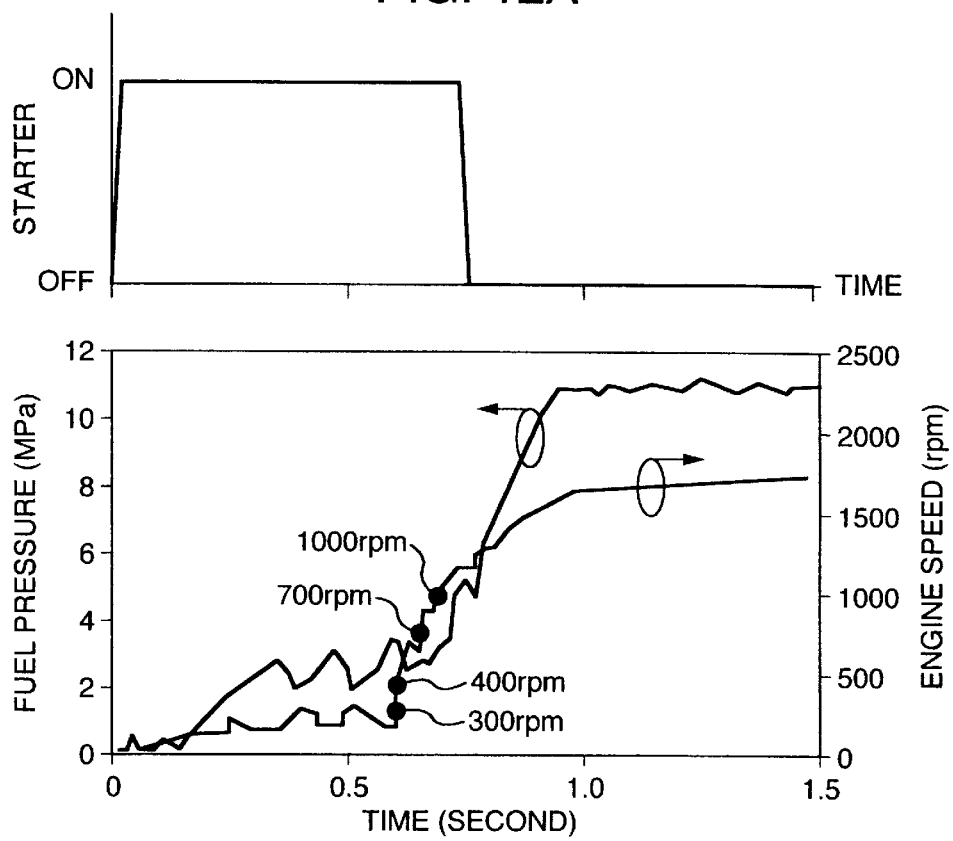
FIG. 12A is a timing chart of starter operation, fuel pressure and an engine revolution speed upon starting up of the engine.
Figure 12B:
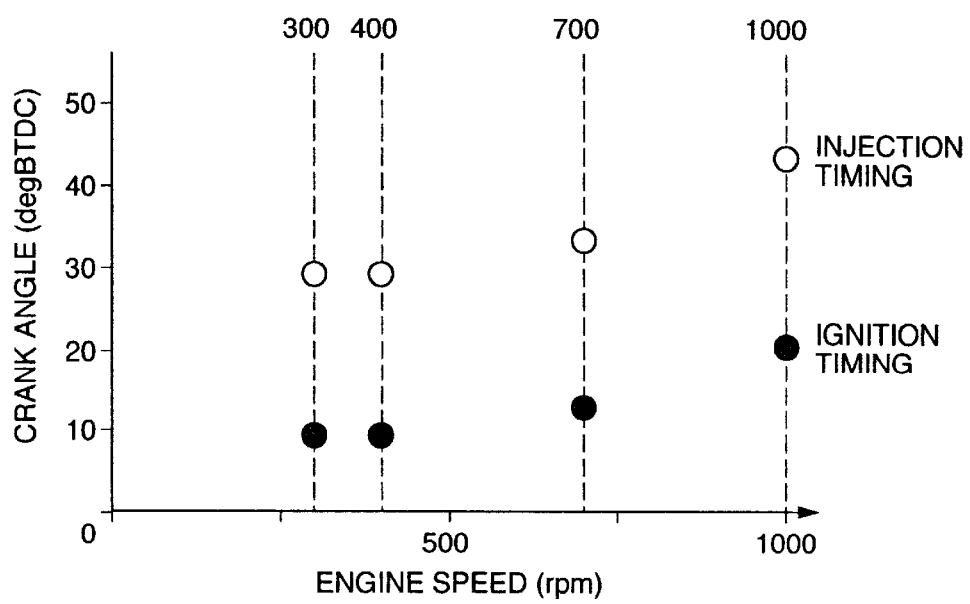
FIG. 12B is a chart showing a relationship between the engine revolution speed and injection/ignition timing.

FIG. 12A is a timing chart of a starter, fuel pressure and the engine revolution speed upon starting up of the engine. FIG. 12B shows a relationship between the engine revolution speed and injection timing/ignition timing during a period of 1.5 seconds from actuation of the starter at 0. While starter is activated, the engine revolution speed is about 200 to 300 r.p.m. At this time, the ignition timing/injection timing is set at 30/10° BTDC for the phenomenon discussed in connection with FIG. 11. FIG. 12B shows variation of the injection timing/ignition timing relative to the engine revolution speed. A fuel pump initiates operation by revolution of the engine to elevate the fuel pressure to about 2 to 3 MPa during a period up to 0.5 seconds. The engine starts injection and ignition after reaching the fuel pressure at a predetermined value and after completion of cylinder discrimination process which will be discussed later. At the initial combustion of the engine, engine revolution speed is abruptly increased to require adjustment of the injection timing/ignition timing according to increase of the engine revolution speed. The injection timing and ignition timing at the engine revolution speed while engine revolution speed is increasing and as marked by solid dot (●) are both varied to advance according to increase of the engine revolution speed. The feature of the present invention is to set the injection timing at the compression stroke for performing stratified charge combustion during actuation of the starter. By using the engine starting method employing stratified charge combustion, the air/fuel ratio upon starting of the engine can be set at about 25. While the air/fuel ratio in the whole combustion chamber is lean as set at 25, since the fuel is injected around the ignition plug at an appropriate timing, the air/fuel mixture having a combustible range of mixture ratio is established around the ignition plug for assuring combustion. Furthermore, since large amount of fuel resulting in discharge of unburned fuel as in the conventional engine starting method, can be avoided to achieve reduction of HC upon starting of the engine.

Figure 13:
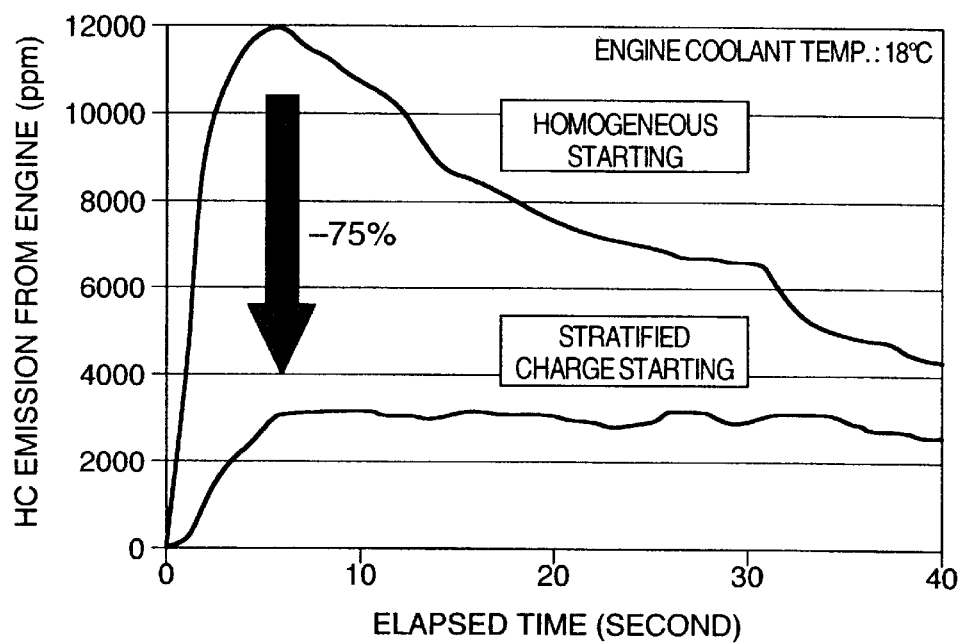
FIG. 13 is a chart showing comparison of HC emission characteristics between stratified charge mixture starting up and homogenous mixture starting up in the embodiment of the present invention.

FIG. 13 shows discharge characteristics of HC (unburned fuel component) to be discharged from the engine during 40 seconds from starting in the stratified charge starting according to the present invention and the conventional homogenous starting. In the stratified charge starting according to the present invention, HC emission amount is increased up to about 3000 r.p.m. after starting of the engine, and then maintained substantially constant thereafter. In contrast to this, in case of the conventional homogenous starting. the HC discharge amount is increase up to about 12,000 ppm immediately after starting of the engine, and gradually reduced subsequently. However, even after 40 seconds from starting of the engine, HC discharge amount is still greater than or equal to 4,000 ppm. As can be appreciated therefrom, by the stratified charge starting according to the present invention, the peak of the unburned HC can be reduced to be 25% of the conventional homogenous starting. Since temperature of the catalytic converter installed in the exhaust pipe cannot be sufficiently elevated for about one minutes from starting of the engine, sufficient purification effect cannot be obtained. Accordingly, reduction of the unburned HC to he discharged from the engine as shown in FIG. 13 is important in the engine system including the catalytic converter.

Next, discussion will be given for fuel spray to be used in the shown embodiment of the tumble guide type cylinder injection engine. The fuel spray injected from the swirl type fuel injection valve employed in the cylinder injection engine becomes a hollow spray. Characteristics of the fuel spray is that the shape of the fuel spray is variable depending upon the pressure within the combustion chamber. For example, when injection is performed during the intake stroke, the pressure in the combustion chamber is the atmospheric pressure or lower. In such time, the fuel spray injected from the fuel injection valve is dispersed over the entire combustion chamber at relatively large spray angle. On the other hand, when injection is performed at latter half of the compression stroke, the pressure in the combustion chamber becomes higher than or equal to the atmospheric pressure. The pressure in the combustion chamber is varied from time to time. For example, when injection is performed under the atmosphere of 0.5 MPa, the fuel spray becomes small in spray angle and compact in size.

Figure 14:
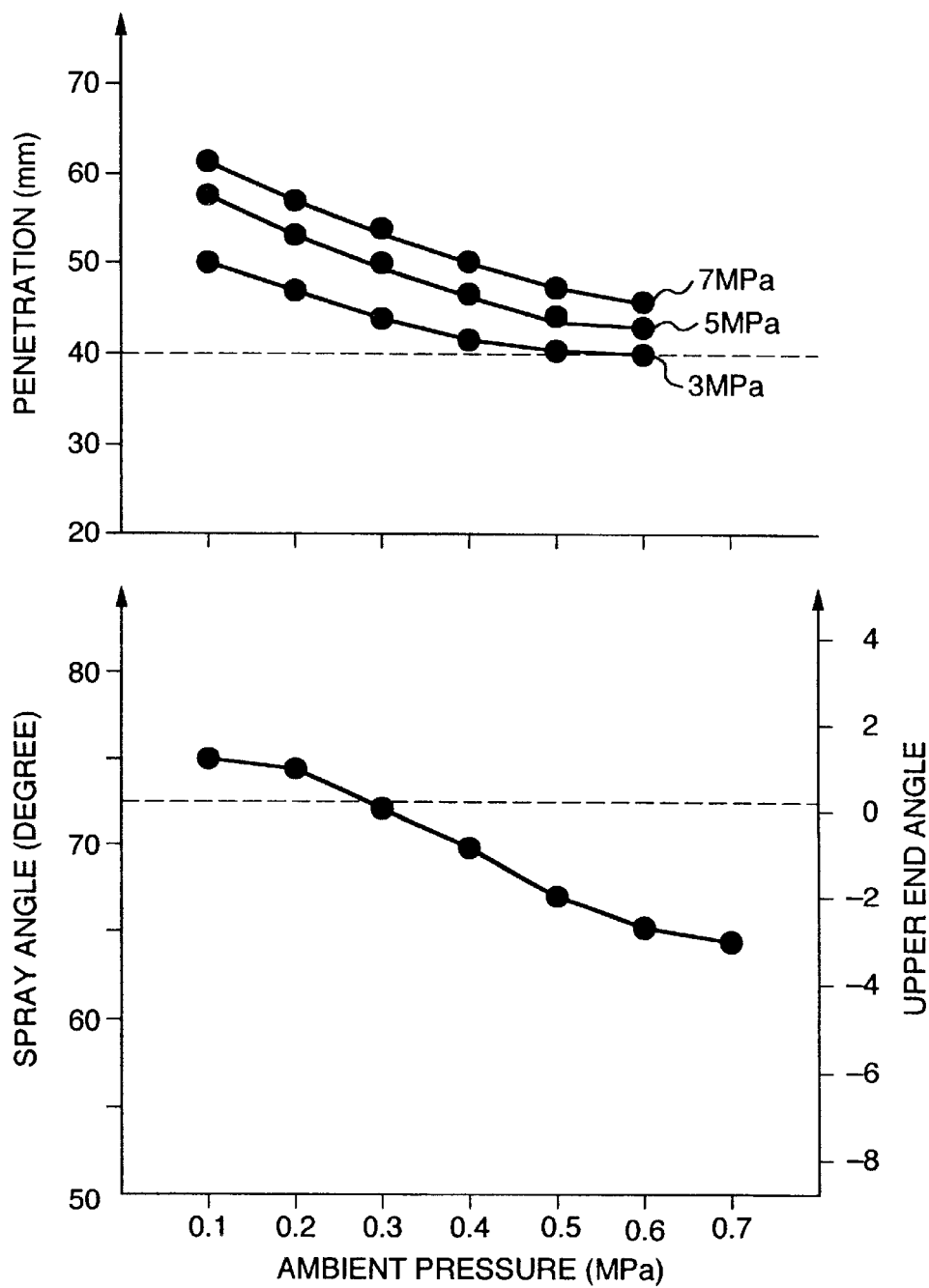
FIG. 14 is a chart showing a spray characteristics of a swirl type spray injection valve.

FIG. 14 shows a relationship between the spray angle of the fuel spray injected from the swirl type spray injection valve employed in the shown embodiment, penetration and the ambient pressure. In the cylinder injection engine, since the pressure in the combustion chamber is varied, the characteristics of the injected fuel spray is variable depending upon the ambient pressure. The fuel penetration becomes shorter according to increase of the ambient pressure. On the other hand, since fuel penetration and atomization level are variable depending upon the fuel pressure, penetration is varied. In case of the engine used for study in the shown embodiment, a distance from the fuel injection valve to the ignition plug was 40 mm. Therefore, necessary condition is that the penetration is greater than or equal to 40 mm under ambient pressure at 0.5 MPa. Accordingly, as a reason why the engine cannot be started at the fuel pressure 2 MPa as shown in FIG. 9, lack of penetration can be considered. On the other hand, the spray angle also becomes smaller depending upon the ambient pressure. The fuel spray having 75° of spray angle at the atmospheric pressure (0.1 MPa) becomes 65° of spray angle under ambient pressure of 0.5 MPa. The fuel spray injected from the swirl type fuel injection valve is basically follow spray shape and envelop portion of the fuel spray is inwardly compressed according to increase of the ambient pressure. The engine studied in the shown embodiment, since the mounting angle of the fuel injection valve is 36°, the upper end angle becomes 0° at 72° of spray angle. Accordingly, according to increase of the ambient pressure, the upper end angle of the fuel spray is varied to the negative side. As shown in FIG. 8, the upper end angle under the pressurized condition for stratified charge starting is 0 to +2° under ambient pressure at 0.5 MPa, spraying has to be selected so that the spray angle becomes 72 to 76°. This corresponds to the spray angle 80 to 84° under atmospheric pressure to narrow a range to be satisfactory in engine designing and fuel spray selection.

Figure 15A:
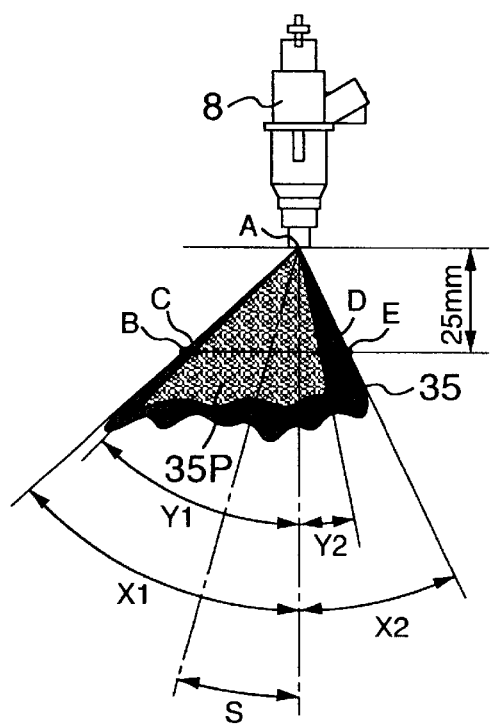
FIGS. 15A and 15B are illustration showing spray characteristics of deflected spray.
Figure 15B:
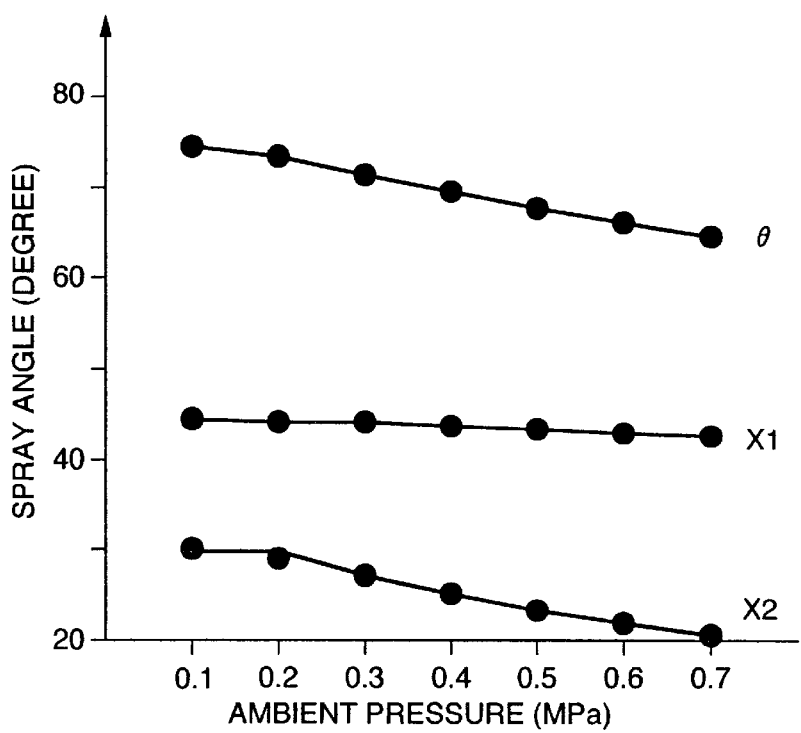

FIG. 15A diagrammatically shown a deflected fuel spray. The deflected fuel spray is the fuel spray to cause non-uniform flow rate distribution by modifying shape of the nozzle of the fuel injection valve. As a result, the shape of the fuel spray become asymmetric to differentiate spray length at left and right sides. Also, injecting direction is also inclined from axial direction of the fuel injection valve. In such fuel spray, the fuel spray on deflected side has higher flow velocity and the fuel spray on the other side has lower flow velocity. Therefore, the spray angle X1 at deflected side is no cause large variation in comparison the spray angle X2 at the opposite side. As shown in FIG. 15B, fuel spray angle θ is varied depending upon the ambient pressure. However, the spray angle X1 on the deflected side causes little variation. By installing the fuel injection valve on the engine with directing the deflected side toward the ignition plug, the upper end angle can be constantly set at 0 to +2° irrespective of the atmosphere pressure.

Next, discussion will be given for a control method of stratified charge starting according to the present invention. In the cylinder injection engine, since the fuel is directly injected into the combustion chamber, injection cannot be performed while the exhaust valves are opened. Accordingly, injection has to be performed with discriminating or identifying the cylinder in intake or compression stroke. Upon starting of the engine, it is not possible to discriminate the cylinder until engine revolution is caused by the starter. Unless discrimination of the cylinder is made as quick as possible after starting revolution of the engine to start fuel injection as quick as possible, startability of the engine can be degraded. FIG. 16 shows a timing chart of stratified charge start control. By activation of the starter, the engine starts revolution. Then, signals are input from a crank angle sensor mounted on the crankshaft or a cam angle sensor mounted on a camshaft, are input to the control unit. Here, discussion will be given for the case of the four-cylinder engine, in which the crank angle sensor provided teeth at every 10° with cutting-out one teeth at every 90° on the crankshaft, and first, second, third and forth teeth are provided on the camshaft. The crank angle sensor thus produces a crank angle sensor signal (POS in the drawing) at every 10° of crankshaft rotation. The teeth cut-out portion is corresponded to the top-dead-center of one of the cylinders. Skipping of the crank angle sensor signal represents reach of the top-dead-center in certain cylinder. However, only with this signal, the cylinder cannot be discriminated. Therefore, a cam angle sensor output (CAM in the drawing) of the cam angle sensor mounted on the camshaft is used to detect number of teeth of the CAM signal at skipping of the POS signal to discriminate which cylinder reaches the compression top-dead-center. Timing of the cylinder discrimination is performed in response to detection of ninth teeth of the crank angle sensor which corresponding to the mid position in the compression stroke, there would be a sufficient period for performing stratified charge starting. This will be discussed with reference to FIG. 16. After starting of engine revolution, the teeth cut-out portion of the POS sensor actually corresponds to the top-dead-center of the #4 cylinder, in practice. Number of teeth of the CAM sensor is detected in synchronism therewith. If the number of teeth is 2, the next cylinder to reach the compression top-dead-center is discriminated as #2 cylinder. On the other hand, if number of teeth is 1, the next cylinder to reach the compression top-dead-center is discriminated as #1 cylinder. Actual injection timing is a timing delayed for $\Delta T_{inj}$ from the cylinder discrimination signal, and the injection pulse width becomes Ti. Also, the ignition signal is output at a timing delayed for $\Delta T_{ign}$ from the cylinder discrimination signal. The feature of the shown embodiment is to ensure combustion at the first injection by initiating start-up control after cylinder discrimination to avoid emission of unburned HC.

FIG. 17 is a flowchart showing a stratified charge start control. Upon turning ON of a key switch and key is turned to a starter actuating position at step 171 to actuate the starter. Then, the engine starts cranking. At step 172, cylinder discrimination (identification) is performed using the crank angle sensor and the cam angle sensor depending upon input engine revolution. At this time, the cylinder to start injection is determined. Next, at steps 173 and 174, the engine revolution speed and the fuel pressure are detected. At step 175, fuel injection timing, ignition timing and fuel injection amount are determined. The fuel injection amount is determined for establishing an air/fuel ratio of the whole cylinder at about 25. At steps 176 and 177, injection and ignition are performed on the basis of the result of cylinder discrimination. At step 178, check is performed whether the engine revolution speed becomes greater than or equal to a predetermined revolution speed, namely complete combustion state is established. If the engine revolution speed is still low, the process is returned to step 173 to again detect the engine revolution speed and the fuel pressure to again set the injection timing and the ignition timing at respectively appropriate timings. When the engine revolution speed is sufficiently increased and the key is returned from the starter actuating position to ON position, starter is stopped at step 179. Thereafter starting control is terminated.

Figure 18:
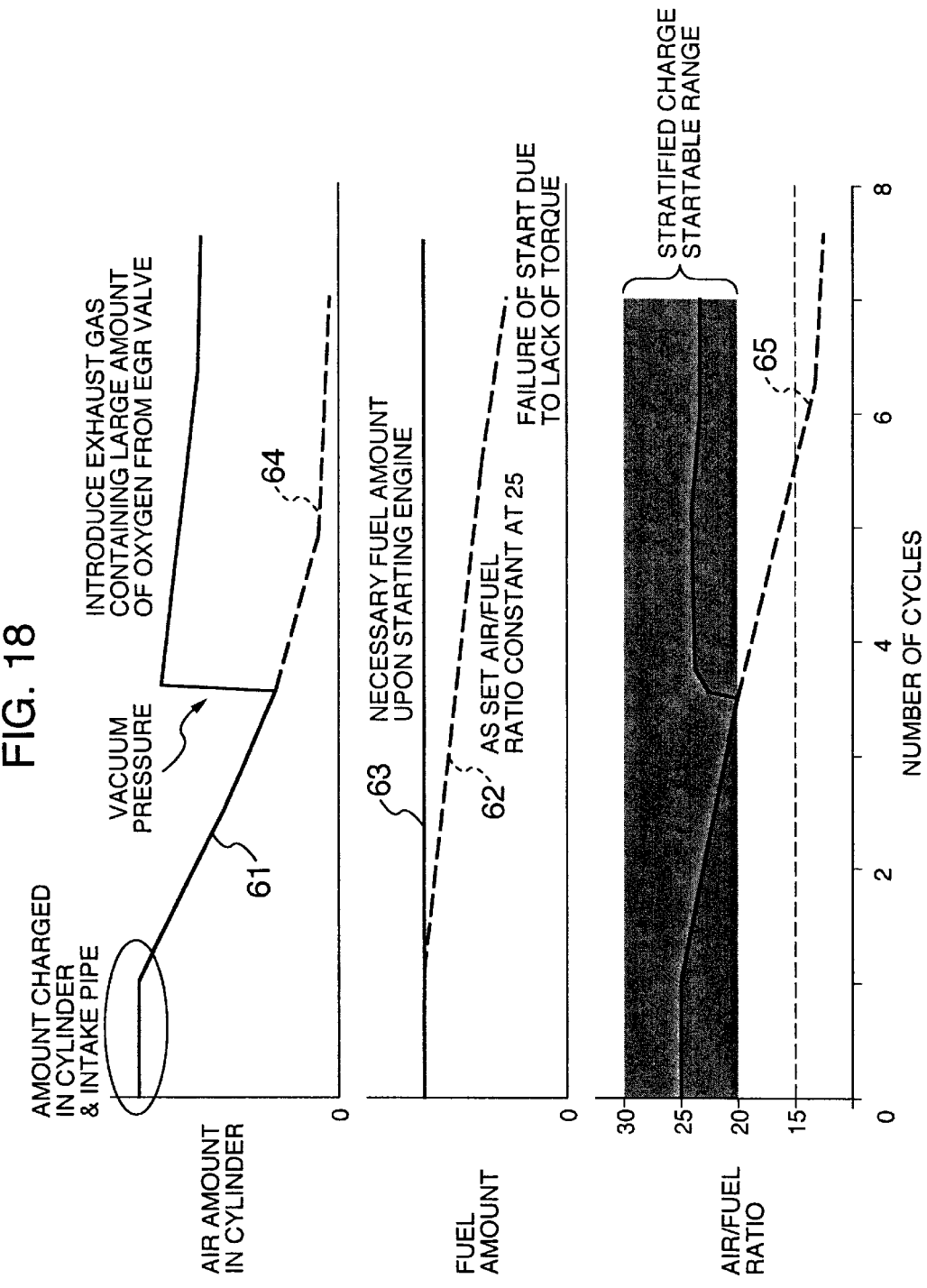
FIG. 18 is an explanatory illustration of the second embodiment of engine starting method according to the present invention.

Next, another embodiment of the present invention will be discussed. FIG. 18 shows variation of an air amount, fuel amount and air/fuel ratio in the cylinder immediately after starting up of the engine. Upon starting up the engine, air is preliminarily filled in the air intake pipe downstream of the throttle valve and the engine cylinder upon starting up of the engine. When the piston starts to move by actuation of starter, air in the engine cylinder and the air intake pipe is consumed and thus reduced as illustrated by 61. However, upon actuation of starter, the throttle valve is not operated and maintained in fully closed position. Therefore, a fresh air is not introduced and thus the air in the cylinder is reduced. If air amount introduced into the cylinder is measured or estimated to control the air/fuel ratio upon starting up of the engine is controlled to be constant at 25 for stratified charge starting, the supply fuel amount is also reduced as illustrated by 62 to lower engine output torque below the torque necessary for starting the engine, namely, the combustion pressure at the first combustion is lowered below necessary pressure value to make engine starting impossible. The reason is that the foregoing control is based on making the air/fuel ratio constant. However, upon starting up the engine, fuel sufficient for increasing the engine revolution speed has to be supplied. Therefore, control given importance for the fuel amount has to be performed. In the stratified charge starting according to the present invention, a range of air/fuel ratio capable of starting up the engine is wide, e.g. 20 to 30. Therefore, as long as the fuel amount necessary for starting up is supplied as illustrated by 63, no precise control of the air/fuel ratio is required. As a method for maintaining the air/fuel ration within the range capable of starting up the engine by supplying air other than the air metered by the throttle valve, opening the EGR valve to recirculate the air from the exhaust pipe to the air intake pipe, may be taken. By consuming the air in the cylinder or the air intake pipe, negative pressure is generated in the cylinder. Therefore, by simply opening the EGR valve, the exhaust gas is easily recirculated into the air intake pipe. The exhaust gas recirculated from the EGR valve contains relatively large amount of air during cranking or stratified charge starting from other cylinders. Therefore, when it is recirculated into the air intake pipe can be re-used for combustion. With the shown embodiment, the fuel supply amount upon starting up of the engine is the amount necessary to driving the engine for revolution, and air may be supplied by the air preliminarily filled in the cylinder and the air recirculated through the EGR valve. At this time, air/fuel ration becomes about 20 to 30 in total. However, since combustible mixture is formed around the ignition plug, sufficient ignition ability to enable starting up of the engine. If the air is not recirculated, the air in the cylinder is reduced as illustrated by 64 and the air/fuel ratio becomes smaller beyond the stratified charge startable range as illustrated by 65.

Figure 19:
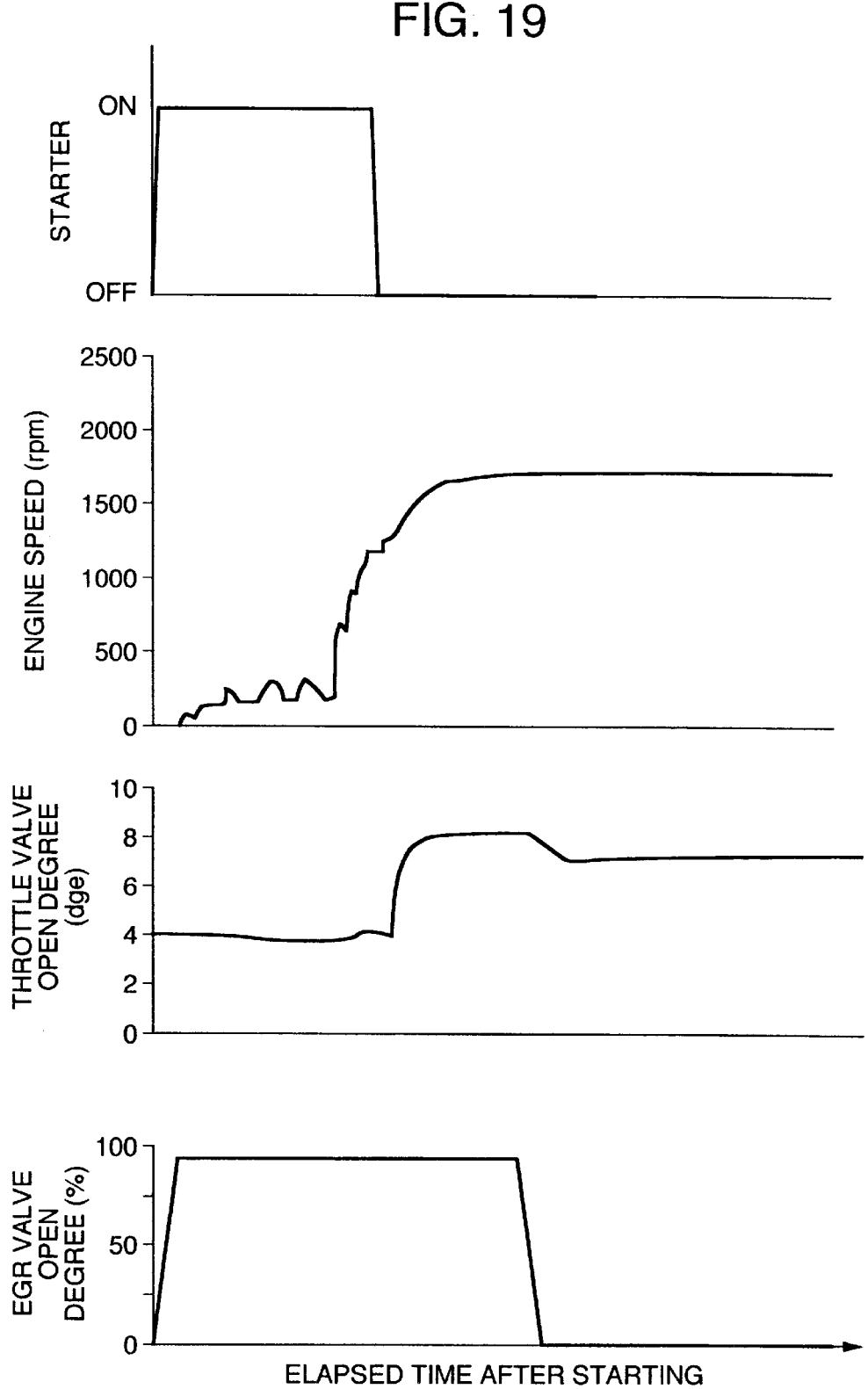
FIG. 19 is an explanatory illustration showing a condition of an EGR control in the second embodiment.

FIG. 19 shows state variation upon the second embodiment of EGR valve control. While starter is active, the engine can be started by stratified charge starting. The throttle valve cannot be operated to increase open degree while the starter is activated for preventing uncontrolled motion. In FIG. 18, during active state of the starter, the throttle valve open degree is fixed at 4° which is neutral position of the spring of the electronic type throttle valve. For driving the throttle valve toward further closing direction or further opening direction, the throttle valve has to be driven by the motor. However, while the starter motor is activated, a driven current is not output to the motor. Therefore, in the shown embodiment, the EGR valve is opened at substantially fully closed position at the same time of actuation of the starter for supply air containing large amount of oxygen from the exhaust pipe to the air intake pipe. By this, air amount in the cylinder will not be reduced to maintain the air/fuel ration within a range permitting stratified charge starting. After starting of the engine, and after the engine revolution speed becomes higher than or equal to the predetermined value, actuation of the starter is terminated, and control of the throttle valve becomes possible. The EGR valve is returned to the fully closed position, and air flow rate control is performed by the throttle valve.

Figure 20:
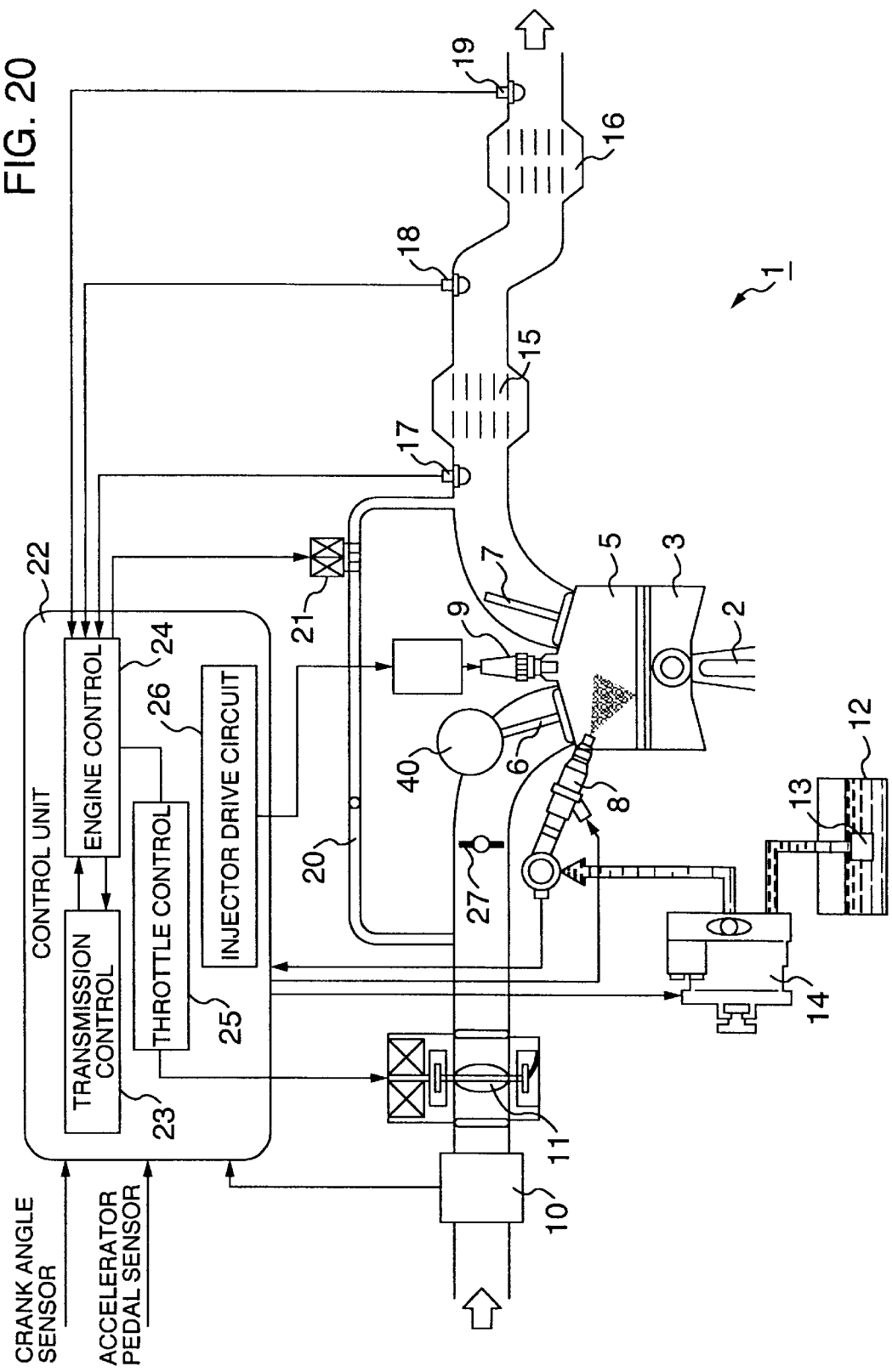
FIG. 20 is a diagrammatic illustration of an engine for implementing the third embodiment of a starting method according to the present invention.
Figure 21A:
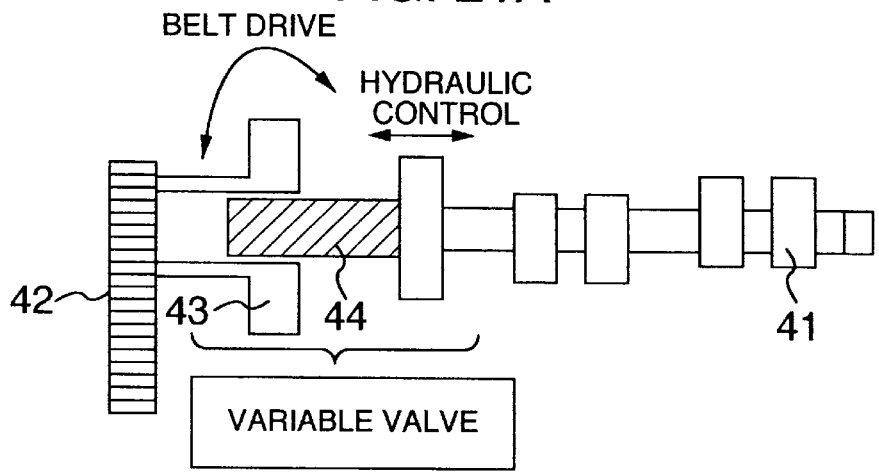
FIG. 21A is a constructional illustration of a phase variable value used in the third embodiment.
Figure 21B:
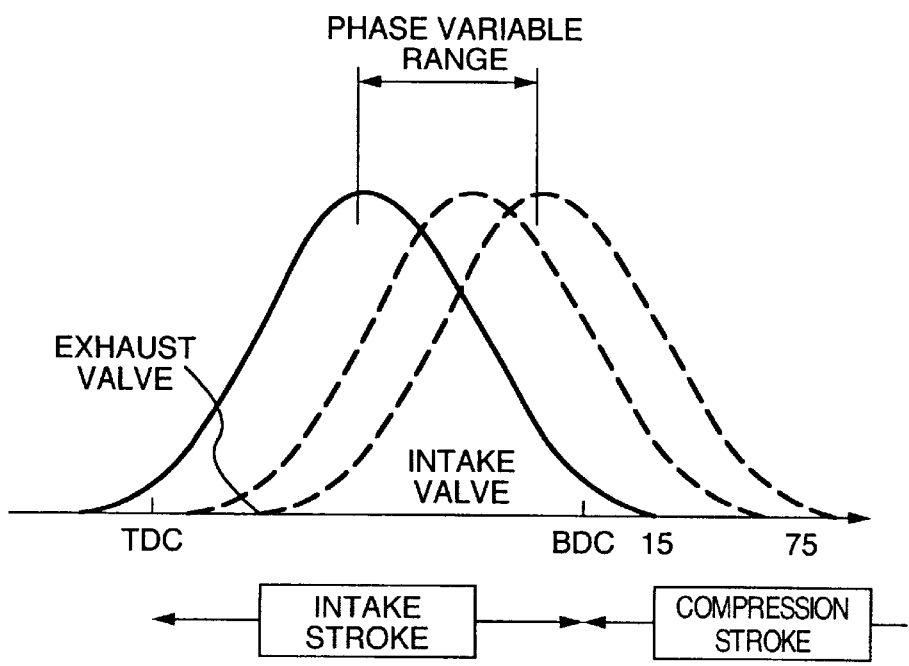
FIG. 21B is a characteristic chart of the variable valve.

FIG. 20 shows the third embodiment of the present invention. The third embodiment is constructed by providing the variable valve 40 to the engine system of FIG. 1. The variable valve 40 is designed for controlling opening and closing timing the intake valves. On example of the construction of the variable valve 40 is shown in FIG. 21A. Between a camshaft 41 and a sprocket 43 driven by a belt 42, a helical gear 44 is provided. By driving the helical gear 44 by hydraulic pressure or the like, relative position of the camshaft 41 and the sprocket 43 is varied for advancing and retarding opening and closing timing of the intake valves as shown in FIG. 22B. Without varying the cam profile for lifting the intake valve, valve opening and closing timing is varied. A phase variation width is 60° in crank angle. Any type of variable valve mechanism may be employed as long as it performs variation of the valve closing timing.

It is effective for stopping the engine while the vehicle is stopping, such as stopping at traffic signal, for fuel economy. Number of times of starting up of the engine is increased. On the other hand, for advancement of technology of the recent engine, compression ratio is becoming greater. In such engine, engine compression load upon starting up of the engine is increased. Therefore, the starter capacity and size becomes greater to increase power consumption. In this circumstance, reduction of the starting load is important not only for reduction of electric power consumption but also for improvement of fuel economy.

As a method for reducing engine compression load upon starting up of the engine, there has been known a method for lowering actual compression ratio by delaying closing timing of the intake valve by the former half period of the compression stroke by the variable valve mechanism. However, when the compression ratio is lowered, lowering of the compression pressure and lowering of compression temperature are caused to degrade flammability of the mixture to be a cause of misfire. In the shown embodiment, even when the compression ratio is lowered by the variable valve, ignite-ability of the mixture is not degraded by performing starting of the engine by stratified charge combustion without causing degradation of emission control performance.

Figure 22:
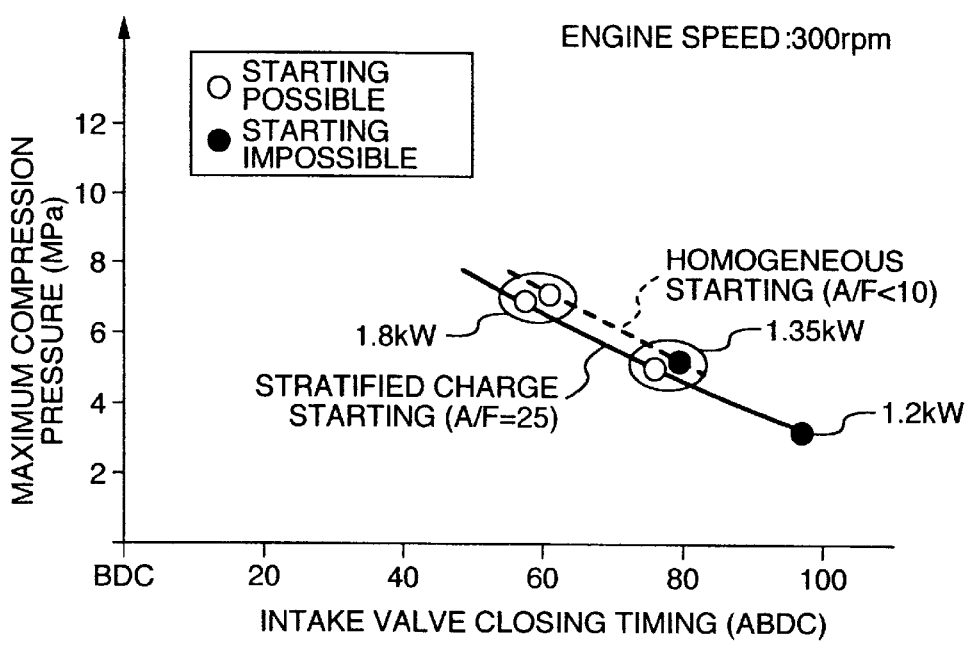
FIG. 22 shows a result of experiment of the third embodiment.

FIG. 22 shows an effect of the third embodiment of the present invention. In FIG. 22, the horizontal axis represents a valve closure timing of the intake valve indicated by the crank angle after bottom-dead-center, the vertical axis represents a maximum pressure during compression stroke. According to lowering of the maximum compression pressure, the valve closure timing of the intake valve is delayed. Accordingly, when the engine can be started at a compression pressure as low as possible, load for causing revolution of the engine by the starter can be lowered to lower electric power consumption. In FIG. 22, a result of conventional homogenous starting is shown by dotted line, and the result of stratified charge starting according to the present invention is shown by solid line. Circular marks represent experiment points at which the valve closure timing of the intake valve is set. While the same experiment points are set for the homogenous starting and stratified charge starting, they are shown at mutually shifted positions for the purpose of illustration. White circle (○) represents success of starting and black circle (●) represents failure of starting. In the homogenous starting, starting up of the engine was successful at 60° after bottom-dead-center of the valve closure timing of the intake valve but failed at 80° after bottom-dead-center of the valve closure timing. On the other hand, in the stratified charge starting, starting of the engine was successfully even at 80° after bottom-dead-center of the valve closure timing of the intake valve but failed at 95° after bottom-dead-center of the valve closure timing. Therefore, even when the valve closure timing of the intake valve is delayed by the variable valve for lowering compression pressure, ignite-ability can be certainly provided by employing the stratified charge starting. Then, electric power consumption can be reduced from 1.8 kW to 1.35 kW. This is quite effective for reduction of electric power consumption and improvement of fuel economy when restarting frequency is increased such as for idling stop system or the like.

Figure 23:
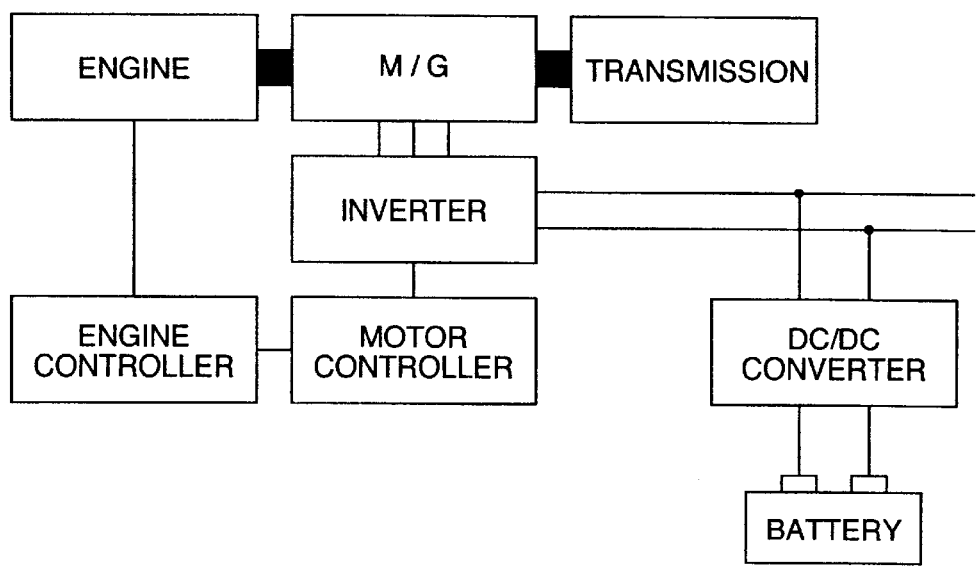
FIG. 23 is a system chart of a hybrid vehicle, to which the present invention is applicable.

Stratified charge starting according to the present invention is also applicable for a hybrid vehicle with combination of the engine and a motor generator as shown in FIG. 23. In the hybrid vehicle, the motor generator connected to the crankshaft can be used as replacement of starting up of the engine. Furthermore, in the hybrid vehicle, measurement for improving fuel economy, such as idle stop or the like, is frequently used, stratified charge starting according to the present invention is quite effective for reducing fuel consumption and lowering exhaust emission.

As set forth above, according to the starting method of the cylinder injection engine according to the invention, deposition of fuel on the piston or cylinder wall can be successfully prevented. Also, HC discharged immediately after starting can be significantly reduced.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A starting method of a cylinder injection engine which includes a combustion chamber introducing air, a fuel injection valve directly injecting a fuel into said combustion chamber, a piston varying volume of said combustion chamber, and a starter for starting up the engine, said method comprising the steps of:
   actuating said starter in a cold start of said engine when an engine coolant temperature is lower than a predetermined value; and
   injecting a fuel provided in deflected spray form during a compression stroke in said step of actuating the starter.

2. A starting method of a cylinder injection engine according to claim 1, further comprising a step of setting a fuel pressure in said injecting of fuel within a range of 2 to 4 MPa, or greater than or equal to 6 MPa.

3. A starting method of a cylinder injection engine according to claim 1, wherein said method further comprises a step of identifying a cylinder in a compression stroke based on detection of a crank angle of the cylinder, and the fuel is injected into the identified cylinder in the compression stroke when said starter is actuated.

4. A starting method of a cylinder injection engine according to claim 1, wherein in a case that said engine is installed in combination with a motor generator in a hybrid vehicle, said engine is started by said motor generator in place of said starter.

5. A starting method of a cylinder injection engine according to claim 2, wherein in a case that said engine is installed in combination with a motor generator in a hybrid vehicle, said engine is started by said motor generator in place of said starter.

6. A starting method of a cylinder injection engine according to claim 3, wherein in a case that said engine is installed in combination with a motor generator in a hybrid vehicle, said engine is started by said motor generator in place of said starter.

7. A starting method of a cylinder injection engine which includes a combustion chamber introducing air, a fuel injection valve directly injecting a fuel into said combustion chamber, a piston varying volume of said combustion chamber, a starter for starting up the engine, an EGR piping connecting an exhaust pipe to an air intake pipe, and an EGR valve, said method comprising the steps of:
   actuating said starter in a cold start of said engine when an engine coolant temperature is lower than a predetermined value;
   opening said EGR valve while said starter is actuated for starting up said engine in said step of actuating the starter; and
   injecting a fuel provided in deflected spray form during a compression stroke in said step of actuating the starter.

8. A starting method of a cylinder injection engine according to claim 7, wherein in a case that said engine is installed in combination with a motor generator in a hybrid vehicle, said engine is started by said motor generator in place of said starter.

9. A starting method of a cylinder injection engine which includes a combustion chamber introducing air, a fuel injection valve directly injecting a fuel into said combustion chamber, and a piston varying volume of said combustion chamber, a starter for starting up the engine and a variable valve mechanism for controlling opening and closing timing of an intake valve, said method comprising the steps of:
   actuating said starter in a cold start of said engine when an engine coolant temperature is lower than a predetermined value;
   controlling a valve closing timing of said intake valve at the maximum retard position while said starter is actuated for starting up said engine in said step of actuating the starter; and
   injecting a fuel provided in deflected spray form during a compression stroke in said step of actuating the starter.

10. A starting method of a cylinder injection engine according to claim 9, wherein in a case that said engine is installed in combination with a motor generator in a hybrid vehicle, said engine is started by said motor generator in place of said starter.

11. A starting system for starting a cylinder injection engine comprising:
   a combustion chamber introducing air,
   a fuel injection valve directly injecting a fuel into said combustion chamber, a piston varying volume of said combustion chamber, a starter for starting up the engine, actuating device for actuating said starter in a cold start of said engine when an engine coolant temperature is lower than a predetermined value; and injection device for injecting a fuel provided in deflected spray form during a compression stroke while the starter is actuated by said actuating device.

12. The starting system of a cylinder injection engine according to claim 11, further comprising a means for setting a fuel pressure in said injecting of fuel within a range of 2 to 4 MPa, or greater than or equal to 6 MPa.

13. The starting system of a cylinder injection engine according to claim 11, wherein said system further comprises a means of identifying a cylinder in a compression stroke based on detection of a crank angle of the cylinder, wherein the fuel is injected into the identified cylinder in the compression stroke when said starter is actuated.

14. The starting system of a cylinder injection engine according to claim 11, wherein in a case that said engine is installed in combination with a motor generator in a hybrid vehicle, said engine is started by said motor generator in place of said starter.

15. The starting system of a cylinder injection engine according to claim 12, wherein in a case that said engine is installed in combination with a motor generator in a hybrid vehicle, said engine is started by said motor generator in place of said starter.

16. The starting system of a cylinder injection engine according to claim 13, wherein in a case that said engine is installed in combination with a motor generator in a hybrid vehicle, said engine is started by said motor generator in place of said starter.

17. A starting system for starting a cylinder injection engine comprising a combustion chamber introducing air, a fuel injection valve directly injecting a fuel into said combustion chamber, a piston varying volume of said combustion chamber, a starter for starting up the engine, an EGR piping connecting an exhaust pipe to an air intake pipe, an EGR valve, actuating device for actuating said starter in a cold start of said engine when an engine coolant temperature is lower than a predetermined value;

opening device for opening said EGR valve while said starter is actuated for starting up said engine when said starter is actuated by said actuating device; and injection device for injecting a fuel provided in deflected spray form during a compression stroke when the starter is actuated.

18. The starting system of a cylinder injection engine according to claim 17, wherein in a case that said engine is installed in combination with a motor generator in a hybrid vehicle, said engine is started by said motor generator in place of said starter.

19. A starting system for starting a cylinder injection engine comprising:

a combustion chamber introducing air, a fuel injection valve directly injecting a fuel into said combustion chamber, a piston varying volume of said combustion chamber, a starter for starting up the engine, a variable valve mechanism for controlling opening and closing timing of an intake valve, actuating device for actuating said starter in a cold start of said engine when an engine coolant temperature is lower than a predetermined value;

control device for controlling a valve closing timing of said intake valve at the maximum retard position while said starter is actuated for starting up said engine during actuation of the starter; and injection device for injecting a fuel provided in deflected spray form during a compression stroke when said starter is actuated by said actuating device.

20. The starting system of a cylinder injection engine according to claim 19, wherein in a case that said engine is installed in combination with a motor generator in a hybrid vehicle, said engine is started by said motor generator in place of said starter.

* * * * *